US011156270B2

(12) United States Patent
Fliearman et al.

(10) Patent No.: US 11,156,270 B2
(45) Date of Patent: Oct. 26, 2021

(54) MULTI-MODE INTEGRATED STARTER-GENERATOR DEVICE WITH TRANSMISSION ASSEMBLY MOUNTING ARRANGEMENT

(71) Applicant: Deere & Company, Moline, IL (US)

(72) Inventors: Steven R. Fliearman, Coffeyville, KS (US); Lisa R. Lloyd, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 29 days.

(21) Appl. No.: 16/386,052

(22) Filed: Apr. 16, 2019

(65) Prior Publication Data
US 2020/0332867 A1 Oct. 22, 2020

(51) Int. Cl.
*F16H 3/66* (2006.01)
*A01D 69/06* (2006.01)
*A01D 69/02* (2006.01)

(52) U.S. Cl.
CPC .............. *F16H 3/666* (2013.01); *A01D 69/02* (2013.01); *A01D 69/06* (2013.01);
(Continued)

(58) Field of Classification Search
CPC ............ F16H 3/666; F16H 2200/2064; F16H 2200/2038; F16H 2200/0039;
(Continued)

(56) References Cited

U.S. PATENT DOCUMENTS 2,685,948 A   8/1954   Freeman et al.
3,062,073 A   11/1962  Brass
(Continued)

FOREIGN PATENT DOCUMENTS

DE   69218975 T2   6/1994
DE   19745995 A1   9/1998
(Continued)

OTHER PUBLICATIONS

Harmonic Drive LLC, Harmonic Planetary Precision Gearing & Motion Control, Product Brochure, Mar. 2006.
(Continued)

*Primary Examiner* — Charles A Fox
*Assistant Examiner* — Lori Wu
(74) *Attorney, Agent, or Firm* — Klintworth & Rozenblat IP LLP

(57) ABSTRACT

A combination starter-generator device is provided for a work vehicle having an engine. The starter-generator device includes an electric machine and a gear set configured to receive rotational input from the electric machine and the engine. The gear set includes a ring gear formed by a cylindrical base with a perimeter surface facing the engine and a circumferential row of castellations extending in a radial direction from the perimeter surface. The starter-generator device further includes a mounting arrangement comprising a drive plate configured to be secured to a crank shaft of the engine and a flex plate mounted to the drive plate. The flex plate includes a row of engagement apertures configured to receive the castellations of the ring gear to rotationally couple the ring gear to the engine via the mounting arrangement.

18 Claims, 13 Drawing Sheets

(52) U.S. Cl.
CPC .......... *F16H 2200/0039* (2013.01); *F16H 2200/2007* (2013.01); *F16H 2200/2038* (2013.01); *F16H 2200/2064* (2013.01)

(58) Field of Classification Search
CPC .......... F16H 2200/2007; F16H 57/023; A01D 69/02; A01D 69/06
See application file for complete search history.

(56) References Cited

U.S. PATENT DOCUMENTS

| | | | |
|---|---|---|---|
| 3,081,759 A * | 3/1963 | Mauck | F02N 5/02 123/185.14 |
| 3,150,544 A | 9/1964 | Brass | |
| 3,640,152 A | 2/1972 | Shirai et al. | |
| 3,675,511 A | 7/1972 | Wakamatsu et al. | |
| 3,942,024 A | 3/1976 | Ingham | |
| 4,122,354 A | 10/1978 | Howland | |
| 4,213,299 A | 7/1980 | Sharar | |
| 4,473,752 A | 9/1984 | Cronin | |
| 4,484,495 A | 11/1984 | Mason | |
| 4,631,455 A | 12/1986 | Taishoff | |
| 4,708,030 A | 11/1987 | Cordner | |
| 4,750,384 A | 6/1988 | Belliveau | |
| 4,862,009 A | 8/1989 | King | |
| 4,926,713 A | 5/1990 | Madill | |
| 5,033,994 A | 7/1991 | Wu | |
| 5,177,968 A | 1/1993 | Fellows | |
| 5,418,400 A | 5/1995 | Stockton | |
| 5,558,173 A | 9/1996 | Sherman | |
| 5,856,709 A | 1/1999 | Ibaraki et al. | |
| 6,015,363 A | 1/2000 | Mathis | |
| 6,371,877 B1 | 4/2002 | Schroeder et al. | |
| 6,378,479 B1 * | 4/2002 | Nishidate | F02N 15/006 123/179.24 |
| RE37,743 E | 6/2002 | Yang | |
| 6,409,622 B1 | 6/2002 | Bolz et al. | |
| 6,484,596 B2 | 11/2002 | Puchas | |
| 6,569,054 B2 | 5/2003 | Kato | |
| 6,582,333 B2 | 6/2003 | Man | |
| 6,661,109 B2 | 12/2003 | Fukasaku et al. | |
| 6,746,354 B1 | 6/2004 | Ziemer | |
| 6,770,005 B2 | 8/2004 | Aikawa et al. | |
| 6,832,970 B2 | 12/2004 | Eibler | |
| 6,852,063 B2 | 2/2005 | Takahashi et al. | |
| 6,910,453 B2 | 6/2005 | Sugino et al. | |
| 6,965,173 B2 | 11/2005 | Fukasaku et al. | |
| 7,028,794 B2 | 4/2006 | Odahara et al. | |
| 7,044,255 B2 | 5/2006 | Maeda et al. | |
| 7,086,978 B2 | 8/2006 | Aikawa et al. | |
| 7,117,965 B2 | 10/2006 | Yatabe et al. | |
| 7,223,191 B2 | 5/2007 | Aikawa et al. | |
| 7,374,031 B2 | 5/2008 | Skorucak | |
| 7,387,043 B2 | 6/2008 | Sakamoto et al. | |
| 7,503,871 B2 | 3/2009 | Kozarekar et al. | |
| 7,582,033 B2 | 9/2009 | Kefti-Cherif et al. | |
| 7,753,147 B2 | 7/2010 | Usoro | |
| 7,780,562 B2 | 8/2010 | King et al. | |
| 8,143,735 B2 | 3/2012 | Bauer | |
| 8,226,517 B2 | 7/2012 | Tsai et al. | |
| 8,235,859 B2 | 8/2012 | Yun | |
| 8,480,529 B2 | 7/2013 | Pohl et al. | |
| 8,500,601 B2 | 8/2013 | Arnold et al. | |
| 8,584,359 B1 * | 11/2013 | Bowman | F16H 1/46 29/893.1 |
| 8,727,944 B2 | 5/2014 | Noboru et al. | |
| 8,734,281 B2 | 5/2014 | Ai et al. | |
| 8,996,227 B2 | 3/2015 | Sisk et al. | |
| 9,017,207 B2 | 4/2015 | Pohl et al. | |
| 9,074,656 B2 | 7/2015 | Benz et al. | |
| 9,145,136 B2 | 9/2015 | Suntharalingam et al. | |
| 9,184,646 B2 | 11/2015 | Fulton | |
| 9,261,064 B2 | 2/2016 | Patel et al. | |
| 9,371,810 B2 | 6/2016 | Creviston | |
| 9,421,855 B2 | 8/2016 | Suntharalingam et al. | |
| 9,541,172 B1 | 1/2017 | Wright | |
| 9,555,795 B2 | 1/2017 | Nefcy et al. | |
| 9,676,265 B2 | 6/2017 | Choi | |
| 9,726,282 B2 | 8/2017 | Pohl et al. | |
| 9,829,103 B2 | 11/2017 | Volpert | |
| 10,183,569 B2 | 1/2019 | Toyota et al. | |
| 10,422,389 B2 | 9/2019 | Ebihara | |
| 10,479,187 B2 | 11/2019 | Lubben et al. | |
| 10,518,626 B2 | 12/2019 | Pettersson | |
| 10,591,025 B2 | 3/2020 | Fliearman et al. | |
| 10,619,711 B2 | 4/2020 | Fliearman et al. | |
| 2001/0019210 A1 | 9/2001 | Fukasaku et al. | |
| 2001/0025621 A1 | 10/2001 | Shiraishi et al. | |
| 2001/0042649 A1 | 11/2001 | Maeda et al. | |
| 2002/0019284 A1 | 2/2002 | Aikawa et al. | |
| 2002/0033059 A1 | 3/2002 | Pels et al. | |
| 2002/0117860 A1 | 8/2002 | Man et al. | |
| 2002/0139592 A1 | 10/2002 | Fukasaku et al. | |
| 2002/0177504 A1 | 11/2002 | Pels et al. | |
| 2003/0001391 A1 | 1/2003 | Kuang et al. | |
| 2003/0104900 A1 | 6/2003 | Takahashi | |
| 2003/0224888 A1 | 12/2003 | Wilder et al. | |
| 2004/0055800 A1 | 3/2004 | Katou et al. | |
| 2004/0116226 A1 | 6/2004 | Baker et al. | |
| 2006/0111211 A1 | 5/2006 | Kefti-Cherif et al. | |
| 2006/0166777 A1 | 7/2006 | Aikawa et al. | |
| 2007/0108006 A1 * | 5/2007 | Schmid | F16F 15/1201 192/3.21 |
| 2007/0157899 A1 | 7/2007 | Seufert et al. | |
| 2007/0265126 A1 | 11/2007 | Janson et al. | |
| 2008/0179119 A1 | 7/2008 | Grenn et al. | |
| 2008/0314195 A1 | 12/2008 | Andoh et al. | |
| 2009/0055061 A1 | 2/2009 | Zhu | |
| 2009/0176611 A1 | 7/2009 | Avery | |
| 2009/0264241 A1 | 10/2009 | Dittrich et al. | |
| 2009/0312145 A1 | 12/2009 | Pohl et al. | |
| 2010/0029428 A1 | 2/2010 | Abe et al. | |
| 2010/0044183 A1 | 2/2010 | Guagolz et al. | |
| 2010/0048338 A1 | 2/2010 | Si | |
| 2010/0063704 A1 | 3/2010 | Okubo et al. | |
| 2010/0076634 A1 | 3/2010 | Brigham | |
| 2010/0190602 A1 | 7/2010 | Wittkopp et al. | |
| 2010/0234166 A1 | 9/2010 | Samie et al. | |
| 2011/0010031 A1 | 1/2011 | Syed et al. | |
| 2011/0015020 A1 | 1/2011 | Grosser | |
| 2011/0053729 A1 | 3/2011 | Parsons et al. | |
| 2011/0070999 A1 | 3/2011 | Soliman et al. | |
| 2011/0263379 A1 | 10/2011 | Liang et al. | |
| 2012/0103293 A1 | 5/2012 | Robinette et al. | |
| 2012/0165156 A1 | 6/2012 | Oguri | |
| 2012/0235473 A1 | 9/2012 | Jiang et al. | |
| 2012/0240723 A1 | 9/2012 | Gluckler et al. | |
| 2012/0316026 A1 | 12/2012 | Oguri et al. | |
| 2013/0046427 A1 | 2/2013 | Hohenberg | |
| 2013/0252773 A1 | 9/2013 | Suntharalingam et al. | |
| 2013/0316873 A1 | 11/2013 | Jansen et al. | |
| 2014/0011619 A1 | 1/2014 | Pohl et al. | |
| 2014/0128205 A1 | 5/2014 | Phillips et al. | |
| 2014/0137824 A1 | 5/2014 | Jacques et al. | |
| 2014/0150604 A1 | 6/2014 | Kaltenbach | |
| 2014/0256490 A1 | 9/2014 | Honda | |
| 2015/0226323 A1 | 8/2015 | Pohl et al. | |
| 2015/0239335 A1 | 8/2015 | Wachter et al. | |
| 2016/0031438 A1 | 2/2016 | Matsui et al. | |
| 2016/0031439 A1 | 2/2016 | Nefcy et al. | |
| 2016/0052382 A1 | 2/2016 | Clark et al. | |
| 2016/0076629 A1 | 3/2016 | Modrzejewski et al. | |
| 2016/0082821 A1 | 3/2016 | Mueller et al. | |
| 2016/0096522 A1 | 4/2016 | Ortmann et al. | |
| 2016/0137045 A1 | 5/2016 | Zhu et al. | |
| 2016/0200311 A1 | 7/2016 | Nefcy et al. | |
| 2016/0207525 A1 | 7/2016 | Nefcy et al. | |
| 2016/0258495 A1 | 9/2016 | Bird | |
| 2016/0288780 A1 | 10/2016 | Shukla et al. | |
| 2016/0348741 A1 | 12/2016 | Niemiec et al. | |
| 2017/0248196 A1 | 8/2017 | Turner et al. | |
| 2017/0328470 A1 | 11/2017 | Pohl et al. | |
| 2017/0368925 A1 | 12/2017 | Maki | |
| 2018/0100564 A1 | 4/2018 | Fliearman et al. | |

(56) References Cited

U.S. PATENT DOCUMENTS

| | | | |
|---|---|---|---|
| 2018/0106365 | A1 | 4/2018 | Tsukizaki et al. |
| 2018/0172124 | A1 | 6/2018 | Valente et al. |
| 2018/0186230 | A1 | 7/2018 | Fukuda et al. |
| 2018/0236864 | A1 | 8/2018 | Imamura et al. |
| 2018/0238443 | A1 | 8/2018 | Aulin et al. |
| 2018/0244145 | A1 | 8/2018 | Ohnemus et al. |
| 2018/0298993 | A1 | 10/2018 | Fliearman et al. |
| 2019/0084555 | A1 | 3/2019 | Omura et al. |
| 2019/0160936 | A1 | 5/2019 | Lubben et al. |
| 2019/0176806 | A1 | 6/2019 | Trent |
| 2019/0219022 | A1 | 7/2019 | Patil et al. |
| 2019/0344655 | A1 | 11/2019 | Pettersson |
| 2019/0351751 | A1 | 11/2019 | Sato et al. |

FOREIGN PATENT DOCUMENTS

| | | | |
|---|---|---|---|
| DE | 19927521 | A1 | 6/2000 |
| DE | 19911924 | A1 | 9/2000 |
| DE | 19923316 | A1 | 11/2000 |
| DE | 10003741 | A1 | 4/2001 |
| DE | 010007959 | A1 | 8/2001 |
| DE | 102006037576 | A1 | 4/2008 |
| DE | 102010030570 | A1 | 12/2011 |
| DE | 102010030571 | A1 | 12/2011 |
| DE | 102010060140 | A1 | 4/2012 |
| DE | 102011080068 | A1 | 1/2013 |
| DE | 102011089708 | A1 | 6/2013 |
| DE | 102011089709 | A1 | 6/2013 |
| DE | 102011089710 | A1 | 6/2013 |
| DE | 112011103973 | T5 | 10/2013 |
| DE | 102008045202 | B4 | 3/2014 |
| DE | 102013203009 | A1 | 8/2014 |
| DE | 102013012747 | A1 | 9/2014 |
| DE | 102013206970 | A1 | 10/2014 |
| DE | 102014200720 | A1 | 2/2015 |
| DE | 102014200723 | B3 | 2/2015 |
| DE | 102013219948 | | 4/2015 |
| DE | 102017203026 | A1 | 8/2017 |
| DE | 102017204269 | A1 | 9/2017 |
| EP | 0384808 | A1 | 9/1991 |
| EP | 0645271 | B1 | 3/1995 |
| EP | 0391386 | B1 | 9/1995 |
| EP | 1069310 | A2 | 1/2001 |
| EP | 2272702 | A2 | 1/2011 |
| EP | 2664785 | | 11/2013 |
| GB | 0650564 | | 2/1951 |
| JP | 2015116004 | A | 6/2015 |
| WO | 1999023398 | A2 | 5/1999 |
| WO | 0188369 | A1 | 11/2001 |
| WO | 200700107458 | A2 | 9/2007 |

OTHER PUBLICATIONS

NTN Automotive Sales Headquarters, Compact Clutch Integrated Pulley for Alternators, NTN Technical Review No. 75, 2007.

North Atalantic Starter, Starter Drives Explained, Northatlan.com, 2005.

Deere & Company, Utility U.S. Appl. No. 15/825,520, filed Nov. 29, 2017.

Ioan-Adrian Viorel et al., Integrated Starter-Generators For Automotive Applications, Technical University of Cluj-Romania, Dept. of Electrical Machines, vol. 45, No. 3, 2004.

USPTO Non-Final Office Action dated Mar. 4, 2020 for Utility U.S. Appl. No. 16/385,934.

German Search Report for application No. 1020182214956 dated May 28, 2019.

German Search Report for application No. 1020172030267 dated Aug. 4, 2017.

Deere & Company, Multi-Mode Integrated Starter-Generator Device, Utility U.S. Appl. No. 16/385,860, filed Apr. 16, 2019.

Deere & Company, Multi-Mode Integrated Starter-Generator Device With Preloaded Clutch, Utility U.S. Appl. No. 16/385,892, filed Apr. 16, 2019.

Deere & Company, Multi-Mode Integrated Starter-Generator Device With Magnetic Cam Assembly, Utility U.S. Appl. No. 16/385,934, filed Apr. 16, 2019.

Deere & Company, Multi-Mode Integrated Starter-Generator Device With Cam Arrangement, Utility U.S. Appl. No. 16/385,964, filed Apr. 16, 2019.

Deere & Company, Multi-Mode Integrated Starter-Generator Device With Dog Clutch Arrangement, Utility U.S. Appl. No. 16/385,989, filed Apr. 16, 2019.

Deere & Company, Multi-Mode Starter-Generator Device Transmission With Single Valve Control, Utility U.S. Appl. No. 16/386,001, filed Apr. 16, 2019.

Deere & Company, Multi-Mode Integrated Starter-Generator Device With Electromagnetic Actuation Assembly, Utility U.S. Appl. No. 16/386,020, filed Apr. 16, 2019.

Deere & Company, Multi-Mode Integrated Starter-Generator Device With Preloaded Clutch, Utility U.S. Appl. No. 16/385,784, filed Apr. 16, 2019.

Deere & Company, Multi-Mode Integrated Starter-Generator Device With Solenoid Cam Actuation Apparatus, Utility U.S. Appl. No. 16/386,075, filed Apr. 16, 2019.

USPTO Non-Final Office Action dated Sep. 9, 2019 for Utility U.S. Appl. No. 15/834,356.

USPTO Non-Final Office Action dated Feb. 25, 2019 for Utility U.S. Appl. No. 15/834,356.

USPTO Non-Final Office Action dated Nov. 1, 2018 for Utility U.S. Appl. No. 15/825,520.

USPTO Non-Final Office Action dated Nov. 2, 2017 for Utility U.S. Appl. No. 15/056,767.

USPTO Final Office Action dated Mar. 8, 2019 for Utility U.S. Appl. No. 15/056,767.

USPTO Final Office Action dated Jun. 11, 2018 for Utility U.S. Appl. No. 15/056,767.

USPTO Non-Final Office Action dated Sep. 28, 2018 for Utility U.S. Appl. No. 15/056,767.

German Search Report for application No. 1020182189080 dated May 27, 2019.

German Search Report for application No. 1020182180784 dated Jun. 4, 2019.

USPTO Non-Final Office Action dated Jun. 19, 2020 for Utility U.S. Appl. No. 16/386,075.

USPTO Non-Final Office Action dated Aug. 24, 2020 for Utility U.S. Appl. No. 16/385,964.

USPTO Non-Final Office Action dated Aug. 24, 2020 for Utility U.S. Appl. No. 16/385,784.

German Search Report issued in German Application No. 102020204642.5 dated Sep. 4, 2020. (8 pages).

German Search Report issued in German Application No. 102020204943.3 dated Sep. 4, 2020. (7 pages).

German Search Report issued in German Application No. 102020204704.9 dated Sep. 3, 2020. (7 pages).

German Search Report issued in German Application No. 102020204646.8 dated Sep. 1, 2020. (6 pages).

German Search Report issued in German Application No. 102020204706.5 dated Sep. 3, 2020. (7 pages).

German Search Report issued in German Application No. 102020204795.2 dated Sep. 2, 2020. (7 pages).

German Search Report issued in German Application No. 102020204705.7 dated Sep. 1, 2020. (6 pages).

German Search Report for application No. 102020203063.4 dated Sep. 4, 2020. (6 pages).

USPTO non-final office action issued in pending Utility U.S. Appl. No. 16/385,860 dated Nov. 4, 2020.

* cited by examiner

MULTI-MODE INTEGRATED STARTER-GENERATOR DEVICE WITH TRANSMISSION ASSEMBLY MOUNTING ARRANGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle power systems, including arrangements for starting mechanical power equipment and generating electric power therefrom.

BACKGROUND OF THE DISCLOSURE

Work vehicles, such as those used in the agriculture, construction and forestry industries, and other conventional vehicles may be powered by an internal combustion engine (e.g., a diesel engine), although it is becoming more common for mixed power sources (e.g., engines and electric motors) to be employed. In any case, engines remain the primary power sources of work vehicles and require mechanical input from a starter to initiate rotation of the crankshaft and reciprocation of the pistons within the cylinders. Torque demands for starting an engine are high, particularly so for large diesel engines common in heavy-duty machines.

Work vehicles additionally include subsystems that require electric power. To power these subsystems of the work vehicle, a portion of the engine power may be harnessed using an alternator or generator to generate AC or DC power. The battery of the work vehicle is then charged by inverting the current from the alternator. Conventionally, a belt, direct or serpentine, couples an output shaft of the engine to the alternator to generate the AC power. Torque demands for generating current from the running engine are significantly lower than for engine start-up. In order to appropriately transfer power between the engine and battery to both start the engine and generate electric power, a number of different components and devices are typically required, particularly with respect to mounting and coupling, thereby raising issues with respect to size, cost, and complexity for operation, performance, and assembly.

SUMMARY OF THE DISCLOSURE

This disclosure provides a combined engine starter and electric power generator device with an integral transmission, such as may be used in work vehicles for engine cold start and to generate electric power, thus serving the dual purposes of an engine starter and an alternator with more robust power transmission to and from the engine in both cases.

In one aspect, the disclosure provides a combination starter-generator device for a work vehicle having an engine. The starter-generator device includes an electric machine and a gear set configured to receive rotational input from the electric machine and from the engine and to couple the electric machine and the engine in a first power flow direction and a second power flow direction. The gear set is configured to operate in one of at least a first gear ratio, a second gear ratio, or a third gear ratio in the first power flow direction and at least a fourth gear ratio in the second power flow direction. The gear set includes a ring gear formed by a cylindrical base with a perimeter surface facing the engine and a circumferential row of castellations extending in a radial direction from the perimeter surface. The starter-generator device further includes a mounting arrangement comprising a drive plate configured to be secured to a crank shaft of the engine and a flex plate mounted to the drive plate, wherein the flex plate includes a row of engagement apertures configured to receive the castellations of the ring gear to rotationally couple the ring gear to the engine via the mounting arrangement.

In another aspect, the disclosure provides a drivetrain assembly for a work vehicle. The drivetrain assembly includes an engine; an electric machine; and a gear set configured to receive rotational input from the electric machine and from the engine and to couple the electric machine and the engine in a first power flow direction and a second power flow direction. The gear set is configured to operate in one of at least a first gear ratio, a second gear ratio, or a third gear ratio in the first power flow direction and at least the third gear ratio in the second power flow direction. The gear set includes a ring gear formed by a cylindrical base with a perimeter surface facing the engine and a circumferential row of castellations extending in a radial direction from the perimeter surface. The drivetrain assembly further includes at least one clutch selectively coupled to the gear set to effect the first, second, and third gear ratios in the first power flow direction and the fourth gear ratio in the second power flow direction; an actuation assembly configured to selectively shift the at least one clutch from a disengaged position in which the at least one clutch is decoupled from the gear set into an engaged position in which the at least one clutch is coupled to the gear set; and a mounting arrangement comprising a drive plate configured to be secured to a crank shaft of the engine and a flex plate mounted to the drive plate. The flex plate includes a row of engagement apertures configured to receive the castellations of the ring gear to rotationally couple the ring gear to the engine via the mounting arrangement.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
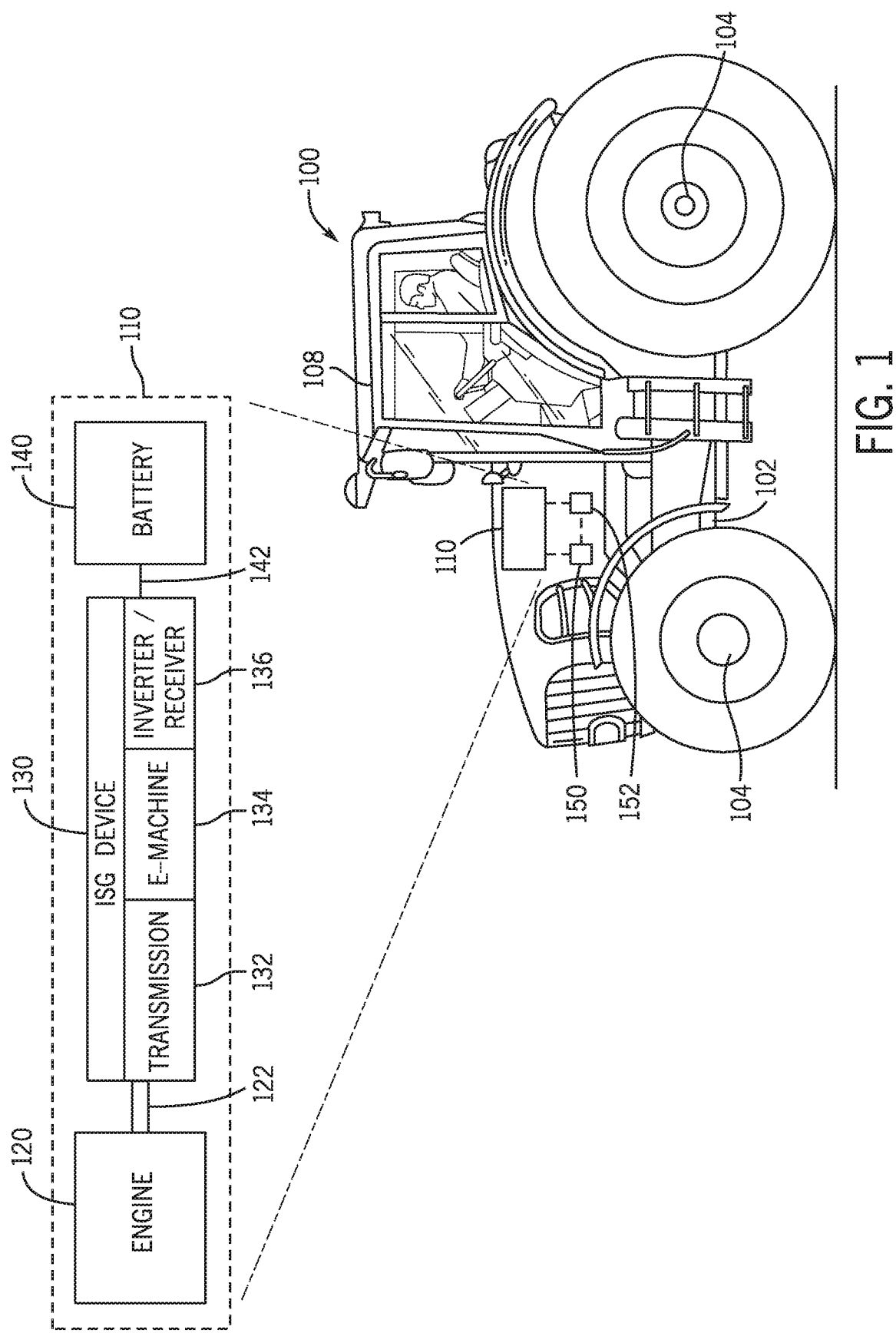
FIG. 1 is a schematic side view of an example work vehicle in the form of an agricultural tractor in which the disclosed integrated starter-generator device may be used.

The following describes one or more example embodiments of the disclosed starter-generator device, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Many conventional vehicle power systems include an internal combustion engine and/or one or more batteries (or other chemical power source) that power various components and subsystems of the vehicle. In certain electric vehicles, a bank of batteries powers the entire vehicle including the drive wheels to impart motion to the vehicle. In hybrid gas and electric vehicles, the motive force may alternate between engine and electric motor power, or the engine power may be supplemented by electric motor power. In still other conventional vehicles, the electric power system is used to initiate engine start up and to run the non-drive electric systems of the vehicle. In the latter case, the vehicle typically has a starter motor that is powered by the vehicle battery to turn the engine crankshaft to move the pistons within the cylinders. In further scenarios, the electric power system may provide a boost to an operating engine.

Some engines (e.g., diesel engines) initiate combustion by compression of the fuel, while other engines rely on a spark generator (e.g., spark plug), which is powered by the battery. Once the engine is operating at a sufficient speed, the power system may harvest the engine power to power the electric system as well as to charge the battery. Typically, this power harvesting is performed with an alternator or other type of power generator. The alternator converts alternating current (AC) power to direct current (DC) power usable by the battery and vehicle electric components by passing the AC power through an inverter (e.g., diode rectifier). Conventional alternators harness power from the engine by coupling a rotor of the alternator to an output shaft of the engine (or a component coupled thereto). Historically this was accomplished by the use of a dedicated belt, but in some more modern vehicles the alternator is one of several devices that are coupled to (and thus powered by) the engine via a single "serpentine" belt.

In certain applications, such as in certain heavy-duty machinery and work vehicles, it may be disadvantageous to have a conventional set-up with separate starter and generator components. Such separate components require separate housings, which may require separate sealing or shielding from the work environment and/or occupy separate positions within the limited space of the engine compartment. Other engine compartment layout complexities may arise as well.

The following describes one or more example implementations of an improved vehicle power system that addresses one or more of these (or other) matters with conventional systems. In one aspect, the disclosed system includes a combination or integrated device that performs the engine cranking function of a starter motor and the electric power generating function of a generator. The device is referred to herein as an integrated starter-generator device ("ISG" or "starter-generator"). This terminology is used herein, at least in some implementations of the system, to be agnostic to the type of power (i.e., AC or DC current) generated by the device. In some implementations, the starter-generator device may function to generate electricity in a manner of what persons of skill in the art may consider a "generator" device that produces DC current directly. However, as used herein, the term "generator" shall mean producing electric power of static or alternating polarity (i.e., AC or DC). Thus, in a special case of the starter-generator device, the electric power generating functionality is akin to that of a conventional alternator, and it generates AC power that is subsequently rectified to DC power, either internally or externally to the starter-generator device.

Further, in certain embodiments, the starter-generator device may have a power transmission assembly that automatically and/or selectively shifts gear ratios (i.e., shifts between power flow paths having different gear ratios). By way of example, the transmission assembly may include one or more passive or active engagement components that engage or disengage to effect power transmission through a power flow path. In this manner, bi-directional or other clutch (or other) configurations may be employed to carry out the cranking and generating functions with the appropriate control hardware. As a result of the bi-directional nature of the power transmission assembly, the power transfer belt arrangement may be implemented with only a single belt tensioner, thereby providing a relatively compact and simple assembly. In addition to providing torque in two different power flow directions, the gear set may also be configured and arranged to provide power transmission from the electric machine to the engine at one of two different speeds, e.g., according to different gear ratios. The selection of speed may provide additional functionality and flexibility for the power transmission assembly.

In certain embodiments, the starter-generator device may include a mounting arrangement with a direct mechanical power coupling to the engine that avoids the use of belts between the engine and the starter-generator device. For example, the starter-generator device may include within its housing a power transmission assembly with a gear set that directly couples to an output shaft of the engine. The gear set may take any of various forms including arrangements with enmeshing spur or other gears as well as arrangements with one or more planetary gear sets. Large gear reduction ratios may be achieved by the transmission assembly such that a single electric machine (i.e., motor or generator) may be used and operated at suitable speeds for one or more types of engine start up, as well as electric power generation. The mounting arrangement may include a torsional damper and flex plate to reduce noise and vibrations. The direct power coupling of the mounting arrangement between the starter-generator device and engine may increase system reliability, cold starting performance, and electric power generation of the system.

Some examples of the actuation assembly described below may use electromechanical solenoid devices. As used herein with respect to the solenoid devices, the term "activated" or "engaged" refers to a command that results in the associated clutch moving into the engaged position. In one example, the engage command for the solenoid devices results in the respective armature being pushed out of the solenoid device, which may occur from applying a current to the coil within the solenoid to push the armature out of the solenoid or from discontinuing current to the coil such that a spring pushes the armature out of the solenoid, or vice versa. In other examples, depending on configuration of the linkage and/or position of the solenoid assembly, the engage command for a solenoid device may result in the armature moving into the solenoid device in order to engage (or disengage) the associated clutch.

Various implementations will be discussed in greater detail below.

Referring to the drawings, an example work vehicle power system as a drivetrain assembly will be described in detail. As will become apparent from the discussion herein, the disclosed system may be used advantageously in a variety of settings and with a variety of machinery. For example, referring now to FIG. 1, the power system (or drivetrain assembly) 110 may be included in a work vehicle 100, which is depicted as an agricultural tractor. It will be understood, however, that other configurations may be possible, including configurations with work vehicle 100 as a different kind of tractor, or as a work vehicle used for other aspects of the agriculture industry or for the construction and forestry industries (e.g., a harvester, a log skidder, a motor grader, and so on). It will further be understood that aspects of the power system 110 may also be used in non-work vehicles and non-vehicle applications (e.g., fixed-location installations).

Briefly, the work vehicle 100 has a main frame or chassis 102 supported by ground-engaging wheels 104, at least the front wheels of which are steerable. The chassis 102 supports the power system (or plant) 110 and an operator cabin 108 in which operator interface and controls (e.g., various joysticks, switches levers, buttons, touchscreens, keyboards, speakers and microphones associated with a speech recognition system) are provided.

As schematically shown, the power system 110 includes an engine 120, an integrated starter-generator device 130, a battery 140, and a controller 150. The engine 120 may be an internal combustion engine or other suitable power source that is suitably coupled to propel the work vehicle 100 via the wheels 104, either autonomously or based on commands from an operator. The battery 140 may represent any one or more suitable energy storage devices that may be used to provide electric power to various systems of the work vehicle 100.

The starter-generator device 130 couples the engine 120 to the battery 140 such that the engine 120 and battery 140 may selectively interact in at least four modes. In a first (or cold engine start) mode, the starter-generator device 130 converts electric power from the battery 140 into mechanical power to drive the engine 120 at a first gear ratio corresponding to a relatively high speed, e.g., during a relatively cold engine start up. In a second (or warm engine start) mode, the starter-generator device 130 converts electric power from the battery 140 into mechanical power to drive the engine 120 at a second gear ratio corresponding to a relatively low speed, e.g., during a relatively warm engine start up. In a third (or boost) mode, the starter-generator device 130 converts electric power from the battery 140 into mechanical power at a third gear ratio corresponding to a relatively low speed to drive the engine 120 for an engine boost. In a fourth (or generation) mode, the starter-generator device 130 converts mechanical power at a fourth (or the third) gear ratio from the engine 120 into electric power to charge the battery 140. Additional details regarding operation of the starter-generator device 130 during the engine start modes, the boost mode, and the generation mode are provided below.

As introduced above, the controller 150 may be considered part of the power system 110 to control various aspects of the work vehicle 100, particularly characteristics of the power system 110. The controller 150 may be a work vehicle electronic controller unit (ECU) or a dedicated controller. In some embodiments, the controller 150 may be configured to receive input commands and to interface with an operator via a human-machine interface or operator interface (not shown) and from various sensors, units, and systems onboard or remote from the work vehicle 100; and in response, the controller 150 generates one or more types of commands for implementation by the power system 110 and/or various systems of work vehicle 100. In one example and as discussed in greater detail below, the controller 150 may command current to electromagnets associated with an actuator assembly to engage and/or disengage the clutches within the starter-generator device 130. Other mechanisms for controlling such clutches may also be provided.

Generally, the controller 150 may be configured as computing devices with associated processor devices and memory architectures, as hydraulic, electrical or electro-hydraulic controllers, or otherwise. As such, the controller 150 may be configured to execute various computational and control functionality with respect to the power system 110 (and other machinery). The controller 150 may be in electronic, hydraulic, or other communication with various other systems or devices of the work vehicle 100. For example, the controller 150 may be in electronic or hydraulic communication with various actuators, sensors, and other devices within (or outside of) the work vehicle 100, including various devices associated with the power system 110. Generally, the controller 150 generates the command signals based on operator input, operational conditions, and routines and/or schedules stored in the memory. For example, the operator may provide inputs to the controller 150 via an operator input device that dictates the appropriate mode, or that at least partially defines the operating conditions in which the appropriate mode is selected by the controller 150. In some examples, the controller 150 may additionally or alternatively operate autonomously without input from a human operator. The controller 150 may communicate with other systems or devices (including other controllers) in various known ways, including via a CAN bus (not shown), via wireless or hydraulic communication means, or otherwise.

Additionally, power system 110 and/or work vehicle 100 may include a hydraulic system 152 with one or more electro-hydraulic control valves (e.g., solenoid valves) that facilitate hydraulic control of various vehicle systems, particularly aspects of the starter-generator device 130. The hydraulic system 152 may further include various pumps, lines, hoses, conduits, tanks, and the like. The hydraulic system 152 may be electrically activated and controlled according to signals from the controller 150. The hydraulic system 152 may be omitted.

In one example, the starter-generator device 130 includes a power transmission assembly (or transmission) 132, an electric machine or motor 134, and an inverter/rectifier device 136, each of which may be operated according to command signals from the controller 150. The power transmission assembly 132 enables the starter-generator device 130 to interface with the engine 120, particularly via a crank shaft 122 or other power transfer element of the engine 120, such as an auxiliary drive shaft. The power transmission assembly 132 may include one or more gear sets in various configurations to provide suitable power flows and gear reductions, as described below. The power transmission assembly 132 variably interfaces with the electric machine 134 in two different power flow directions such that the electric machine 134 operates as a motor during the engine start and boost modes and as a generator during the generation mode. In one example, discussed below, the power transmission assembly 132 is coupled to the electric machine 134 via a power transfer belt arrangement. This arrangement, along with the multiple gear ratios provided by the power transmission assembly 132, permits the electric machine 134 to operate within optimal speed and torque ranges in both power flow directions. The inverter/rectifier device 136 enables the starter-generator device 130 to interface with the battery 140, such as via direct hardwiring or a vehicle power bus 142. In one example, the inverter/rectifier device 136 inverts DC power from the battery 140 into AC power during the engine start modes and rectifies AC power to DC power in the generation mode. In some embodiments, the inverter/rectifier device 136 may be a separate component instead of being incorporated into the starter-generator device 130. Although not shown, the power system 110 may also include a suitable voltage regulator, either incorporated into the starter-generator device 130 or as a separate component.

Figure 2:
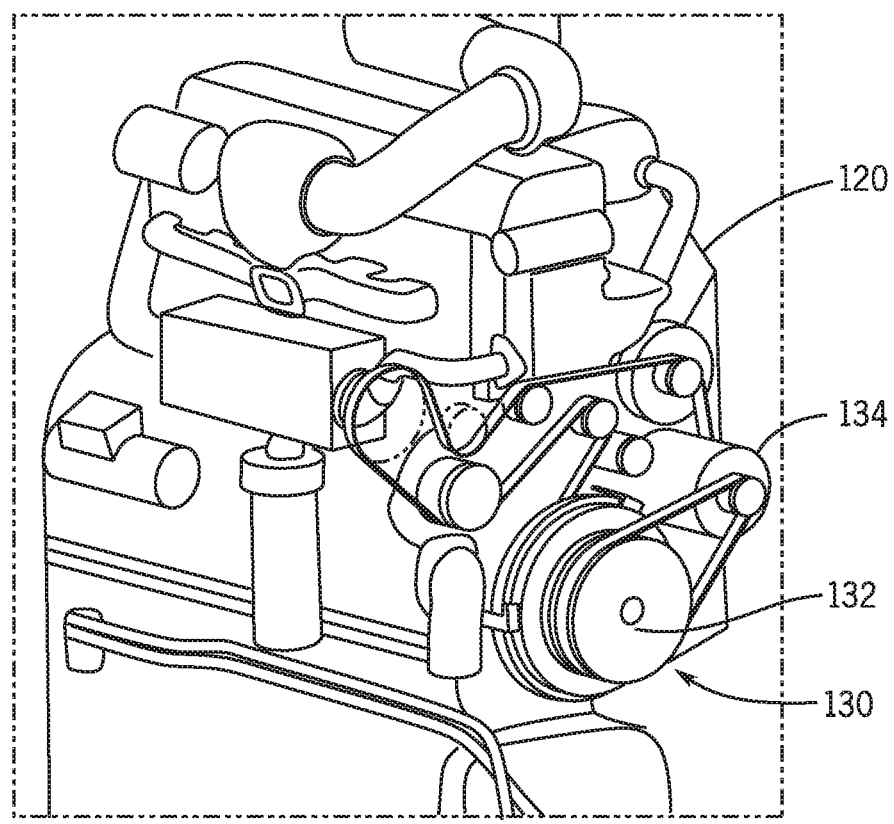
FIG. 2 is a simplified partial isometric view of an engine of the work vehicle of FIG. 1 showing an example mounting location for an example starter-generator device.

Reference is briefly made to FIG. 2, which depicts a simplified partial isometric view of an example mounting location of the starter-generator device 130 relative to the engine 120. In this example, the integrated starter-generator device 130 mounts directly and compactly to the engine 120 so as not to project significantly from the engine 120 (and thereby enlarge the engine compartment space envelope) or interfere with various plumbing lines and access points (e.g., oil tubes and fill opening and the like). Notably, the starter-generator device 130 may generally be mounted on or near the engine 120 in a location suitable for coupling to an engine power transfer element (e.g., a crank shaft 122 as introduced in FIG. 1).

Figure 3:
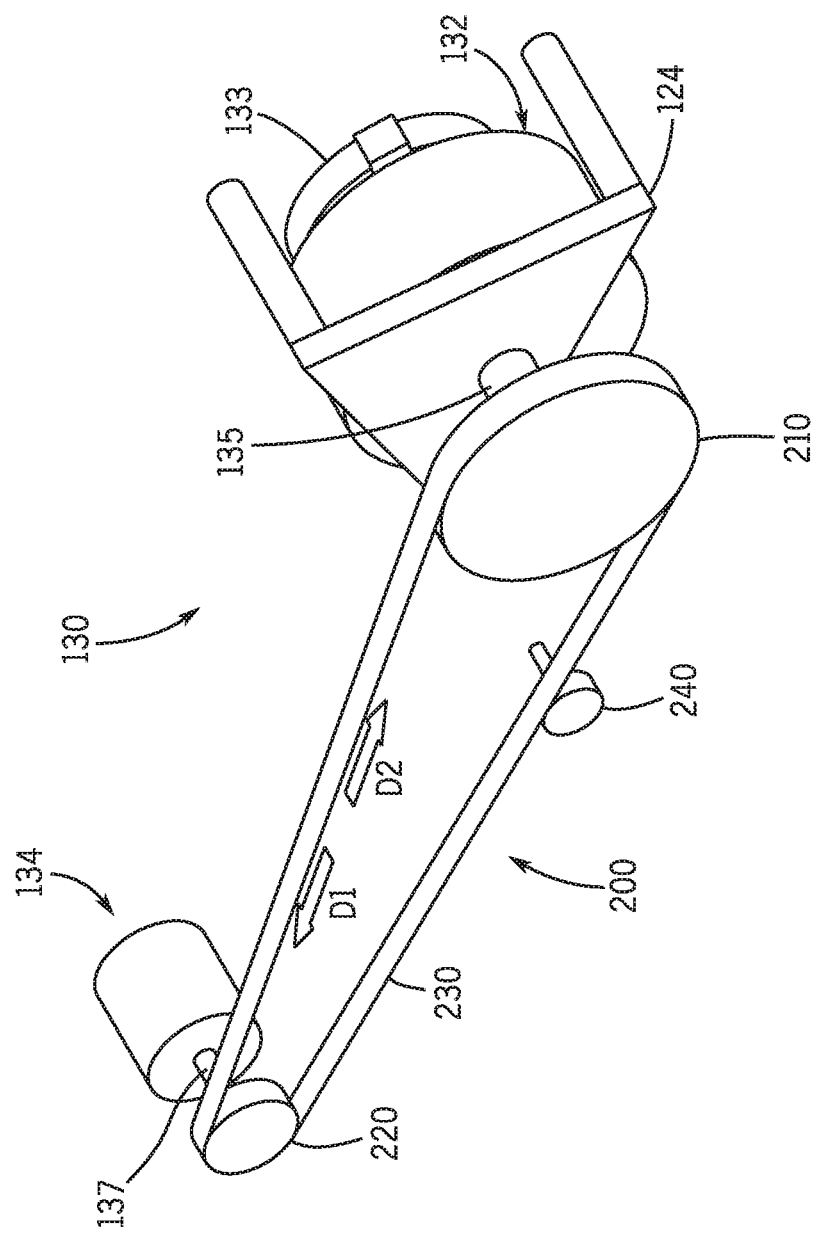
FIG. 3 is a schematic diagram of a portion of a power transfer arrangement of the work vehicle of FIG. 1 having an example starter-generator device.

Reference is additionally made to FIG. 3, which is a simplified schematic diagram of a power transfer belt arrangement 200 between the power transmission assembly 132 and electric machine 134 of the starter-generator device 130. It should be noted that FIGS. 2 and 3 depict one example physical integration or layout configuration of the starter-generator device 130. Other arrangements may be provided, including a more detailed implementation described below with reference to FIGS. 4-15.

In FIG. 3, the power transmission assembly 132 is mounted to the engine 120 and may be supported by a reaction plate 124. As shown, the power transmission assembly 132 includes a first power transfer element 133 that is rotatably coupled to a suitable drive element of the engine 120 and a second power transfer element 135 in the form of a shaft extending on an opposite side of the power transmission assembly 132 from the first power transfer element 133. Similarly, the electric machine 134 is mounted on the engine 120 and includes a further power transfer element 137.

The power transfer belt arrangement 200 includes a first pulley 210 arranged on the second power transfer element 135 of the power transmission assembly 132, a second pulley 220 arranged on the power transfer element 137 of the electric machine 134, and a belt 230 that rotatably couples the first pulley 210 to the second pulley 220 for collective rotation. As described in greater detail below, during the engine start modes, the electric machine 134 pulls the belt 230 to rotate pullies 210, 220 in a first clock direction D1 to drive the power transmission assembly 132 (and thus the engine 120); during the boost mode, the electric machine 134 pulls the belt 230 to rotate pullies 210, 220 in a second clock direction D2 to drive the power transmission assembly 132 (and thus the engine 120); and during the generation mode, the power transmission assembly 132 enables the engine 120 to pull the belt 230 and rotate pullies 210, 220 in the second clock direction D2 to drive the electric machine 134.

As a result of the bi-directional configuration, the power transfer belt arrangement 200 may include only a single belt tensioner 240 to apply tension to a single side of the belt 230 in both directions D1, D2. Using a single belt tensioner 240 to tension the belt 230 is advantageous in that it reduces parts and complexity in comparison to a design that requires multiple belt tensioners. As described below, the bi-directional configuration and associated simplified power transfer belt arrangement 200 are enabled by the bi-directional nature of the gear set in the power transmission assembly 132. Additionally, a difference in the circumferences of the first and second pullies 210, 220 provides a change in the gear ratio between the power transmission assembly 132 and the electric machine 134. In one example, the power transfer belt arrangement 200 may provide a gear ratio of between 3:1-5:1, particularly a 4:1 ratio.

Figure 4:
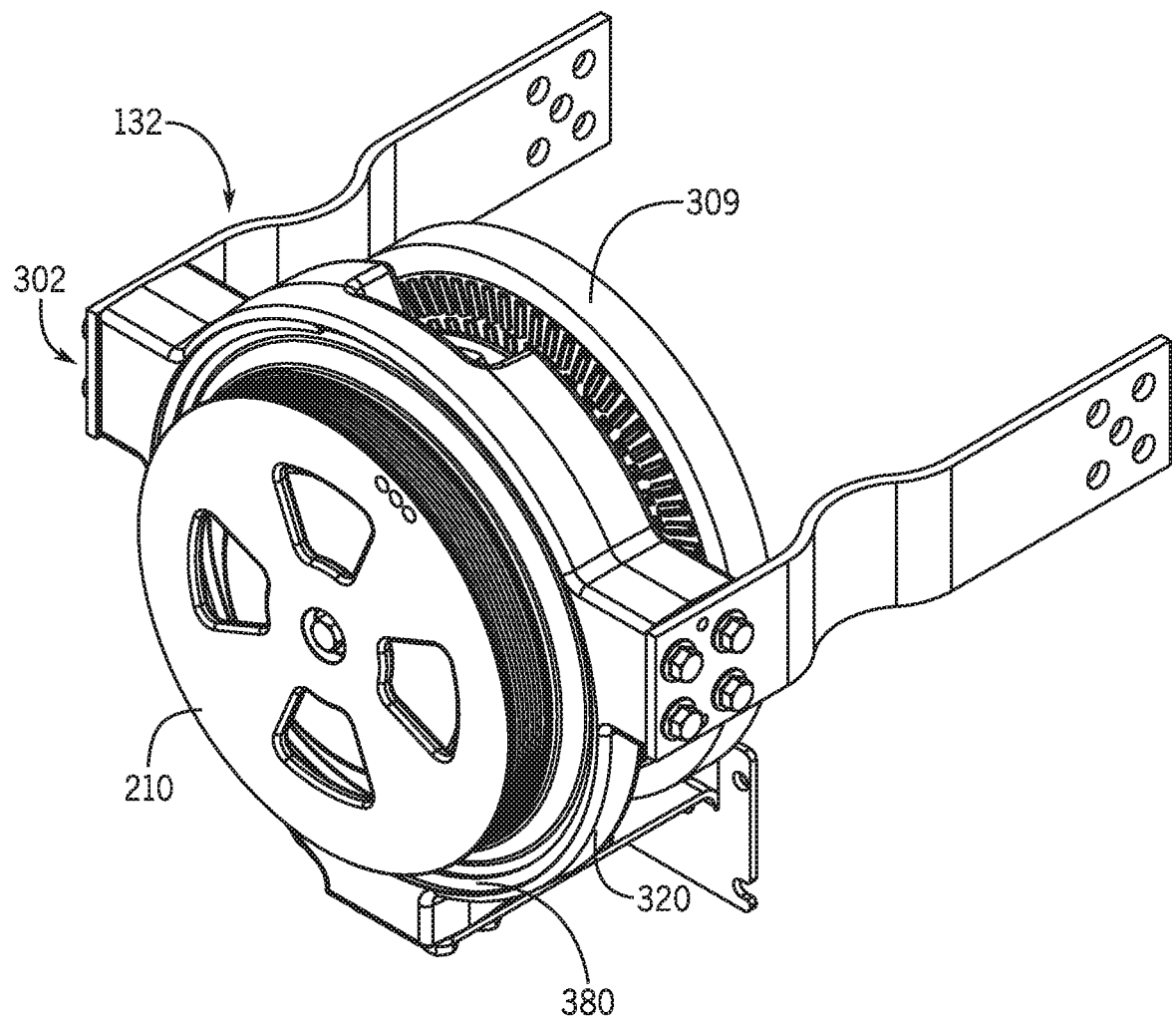
FIG. 4 is a first isometric side view of a power transmission assembly of the example starter-generator device that may be implemented in the work vehicle of FIG. 1.
Figure 5:
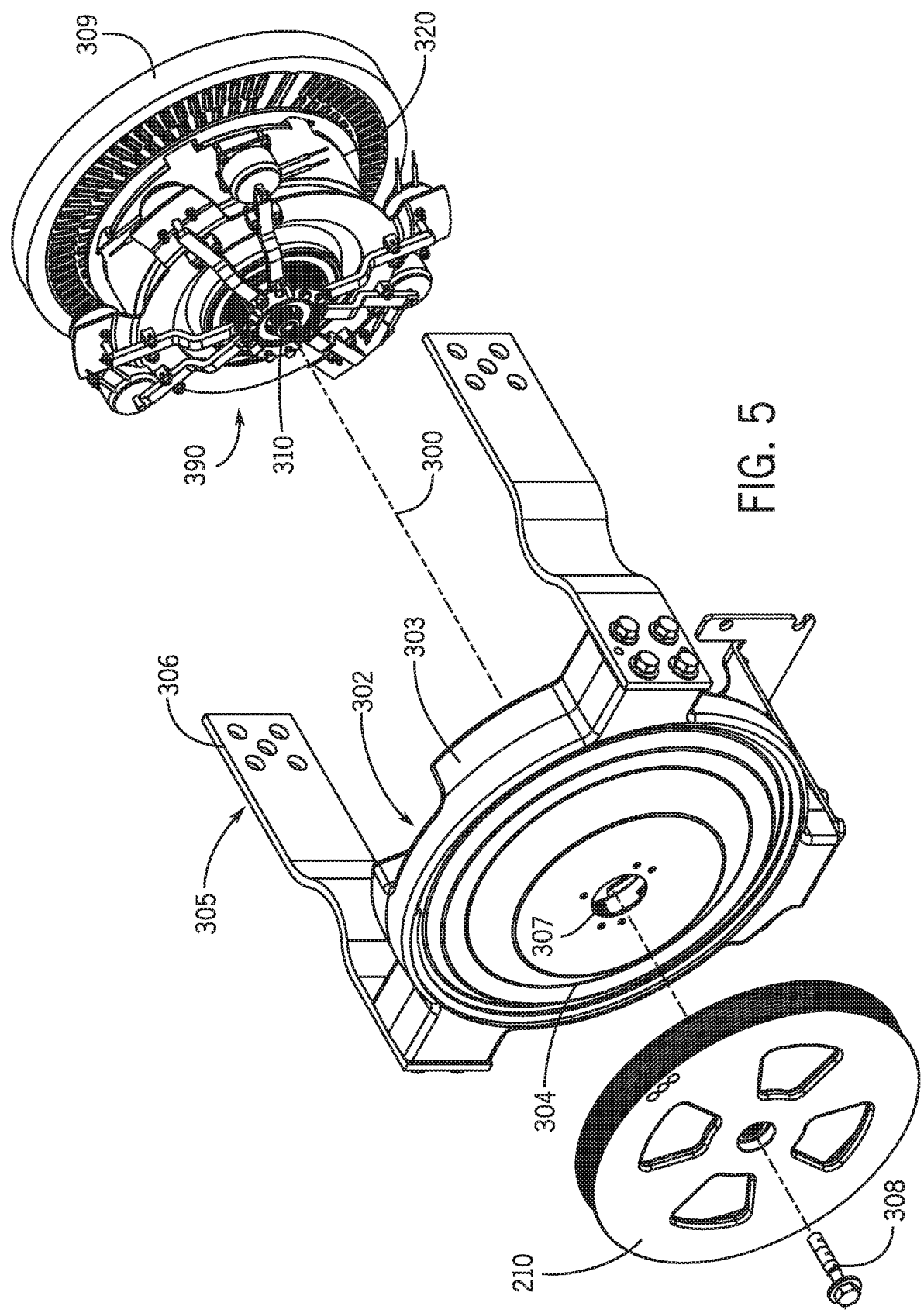
FIG. 5 is an exploded isometric view of the power transmission assembly of FIG. 4 for the example starter-generator device.

Reference is now made to FIG. 4, which is a more detailed isometric side view of the power transmission assembly 132 of the example starter-generator device, and FIG. 5, which is an exploded view of the power transmission assembly 132 of FIG. 4. In one example, the power transmission assembly 132 includes a gear set 320, a clutch arrangement 350 (obscured in FIGS. 4 and 5), and a cam actuation apparatus 390 supported by a primary housing 302 and mounting arrangement 305 that provides a direct mechanical coupling between the power transmission assembly 132 and the engine 120 (FIG. 3). As one example described below, the gear set 320 operates to transfer torque between the engine 120 and electric machine 134 at predetermined gear ratios that are selected based on the status of the clutch arrangement 350, which is controlled by the cam actuation apparatus 390 based on signals from the controller 150. Each aspect of an example power transmission assembly 132 will be discussed below.

The primary housing 302 of the power transmission assembly 132 includes a stationary housing portion 303 that supports a housing cover 304 and the mounting arrangement 305. In one example, the mounting arrangement 305 is formed by one or more leg members 306 that extend from the stationary housing portion 303 and function to mount the power transmission assembly 132 to the engine 120 (FIG. 1). Generally, the stationary housing portion 303 and housing cover 304 are configured to support, shield, and/or protect other portions of the power transmission assembly 132. As shown, the housing cover 304 includes an aperture 307 that enables the power transfer element 135 in the form of pulley 210 (e.g., as discussed above with reference to FIG. 3) to be rotationally coupled to an input shaft 310 of the power transfer assembly 132, which in turn is coupled to the gear set 320 of the power transfer assembly 132. In one example, the pulley 210 may be rotationally coupled to the input shaft 310 with a fastener 308 through the aperture 307 of the housing cover 304.

On one end of the power transmission assembly 132, mounting arrangement 305 may be considered to include a drive plate 309 coupled to the gear set 320 as a power transfer element (e.g., element 133 of FIG. 3). Generally, the drive plate 309 facilitates coupling the power transmission assembly 132 to the engine 120 (FIG. 3). In one example, the drive plate 309 is coupled to the engine crank shaft. The drive plate 309 may also operate as a torsional damper in order to dampen vibrations at the crankshaft of the engine 120 (FIG. 3), as discussed in greater detail below.

Figure 6:
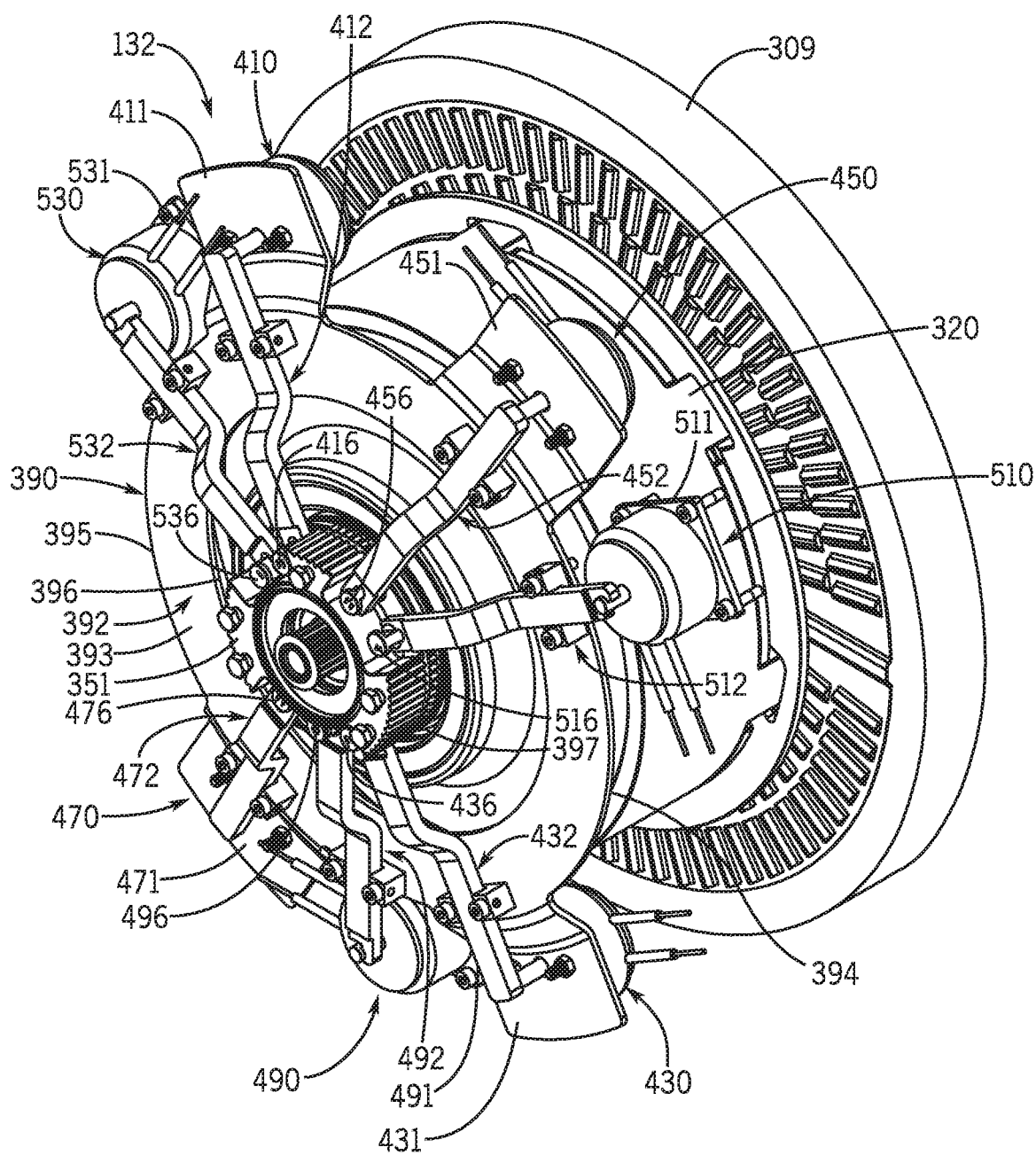
FIG. 6 is a partial isometric view of portions of a solenoid cam actuation apparatus of the power transmission assembly of FIG. 5 for the example starter-generator device.
Figure 7:
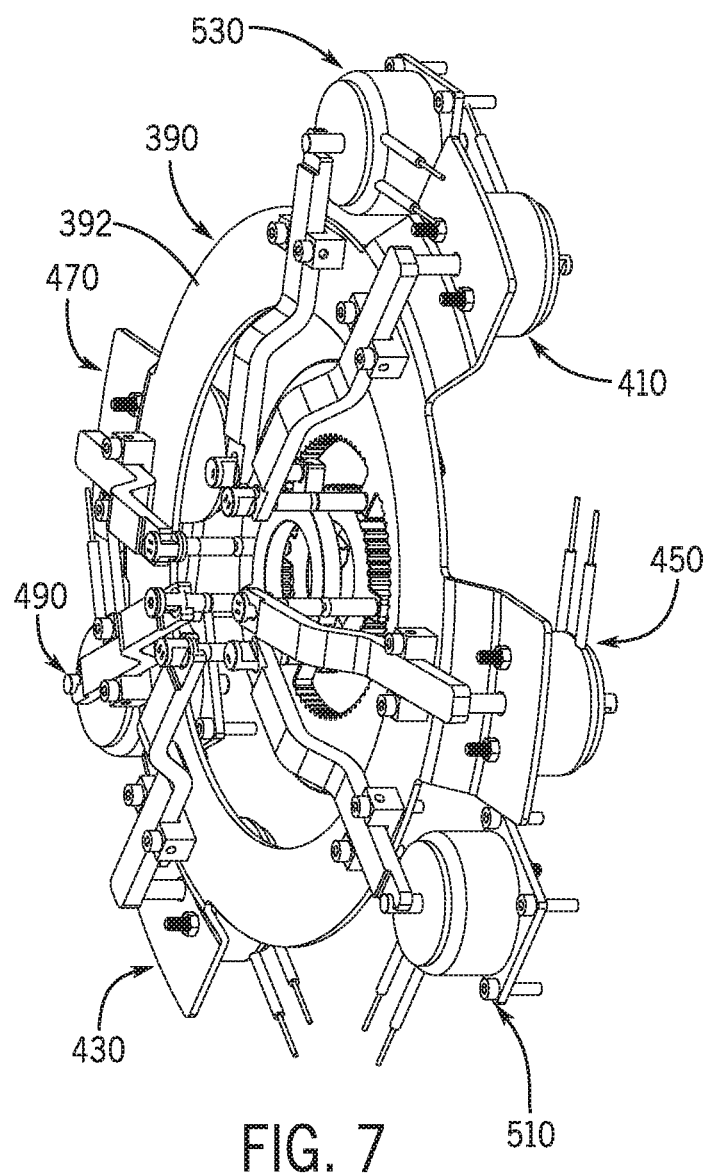
FIG. 7 is an isometric view of the solenoid cam actuation apparatus and clutch arrangement removed from the power transmission assembly of FIG. 4 for the example starter-generator device.

Reference is now made to FIG. 6, which is a partial isometric view of portions of the power transmission assembly 132 with the primary housing 302 removed to more clearly depict the solenoid cam actuation apparatus 390. It should be noted that the cam actuation apparatus 390 is just one example, and other arrangements may be provided. Generally, the cam actuation apparatus 390 includes a base or reaction member 392 formed as a ring or plate-like structure with a first face 393, second face 394, outer perimeter 395, and inner perimeter 396. The inner perimeter 396 defines an opening 397 to accommodate the connection between the input shaft 310 and the power transfer element 135. The opening 397 in the reaction member 392 also accommodates the connections between the cam actuation apparatus 390 and the clutch arrangement 350, as discussed below.

The reaction member 392 additionally supports a number of solenoid devices 410, 430, 450, 470, 490, 510, 530 that interact with the clutch arrangement 350 (obscured in FIG. 6). Specifically, the reaction member 392 supports the solenoid devices 410, 430, 450, 470, 490, 510, 530 on flanges 411, 431, 451, 471, 491, 511, 531. As described in greater detail below, the cam actuation apparatus 390 includes one or more first (or low) solenoid devices 410, 430; one or more second (or mid) solenoid devices 450, 470; and one or more third (or high) solenoid devices 490, 510, 530. In the depicted example, the cam actuation apparatus 390 includes two low clutch solenoid devices 410, 430, two mid clutch solenoid devices 450, 470, and three high clutch solenoid devices 490, 510, 530, although other examples may have different numbers of solenoid apparatuses.

Each of the solenoid devices 410, 430, 450, 470, 490, 510, 530 is coupled to the clutch arrangement 350 via a linkage assembly 412, 432, 452, 472, 492, 512, 532 that includes a link member and pivot member. Specifically, each linkage assembly 412, 432, 452, 472, 492, 512, 532 extends between the respective solenoid device 410, 430, 450, 470, 490, 510, 530 and an actuation pin 416, 436, 456, 476, 496, 516, 536. As described below, the actuation pins 416, 436, 456, 476, 496, 516, 536 are axially repositionable within the clutch arrangement 350 to axially move portions of the clutch arrangement 350 between engaged and disengaged positions to modify the power transfer characteristics of the gear set 320. The actuation pins 416, 436, 456, 476, 496, 516, 536 may be supported by a stationary spindle or hub 351 that circumscribes the input shaft 310.

Figure 8:
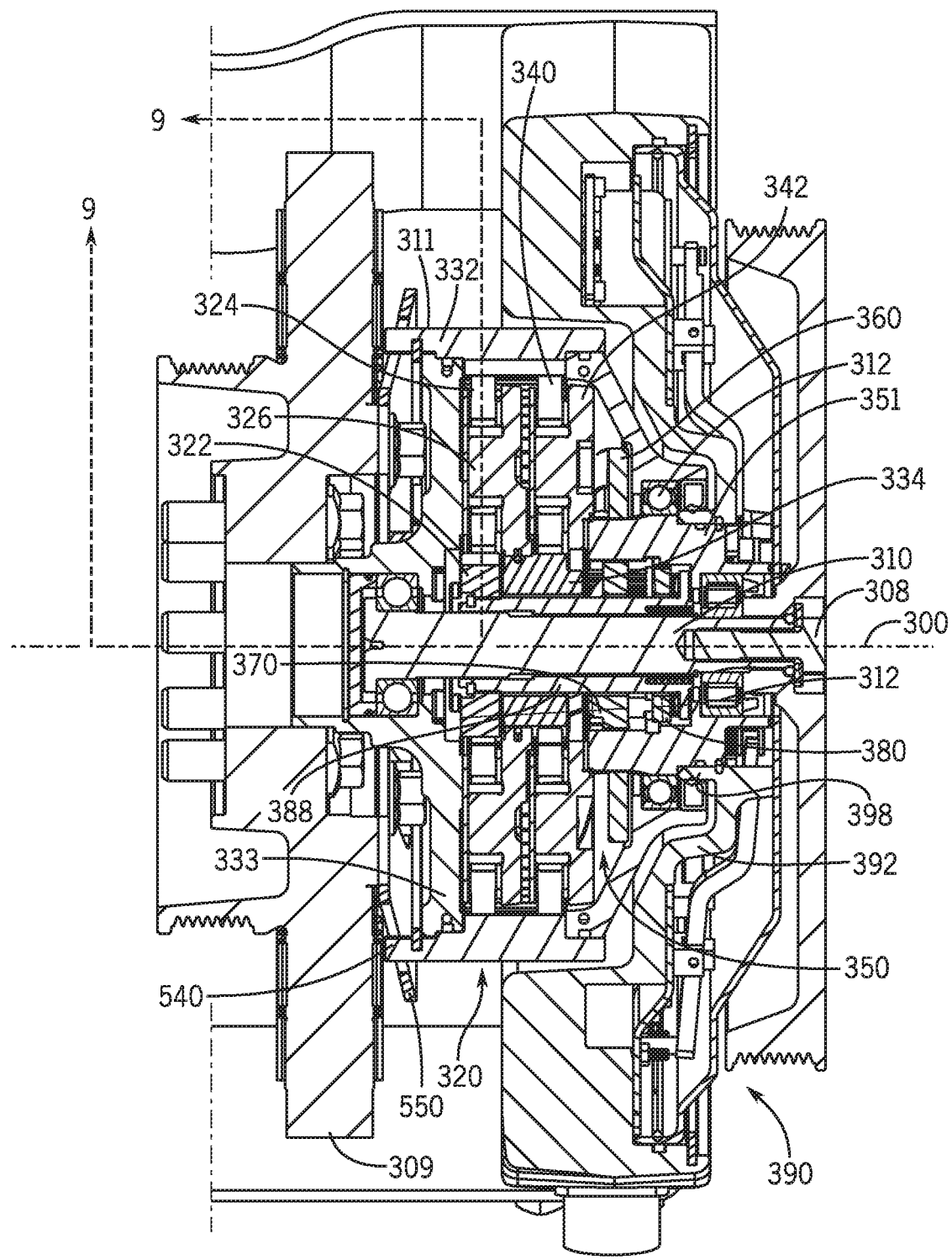
FIG. 8 is a cross-sectional view of the power transmission assembly of FIG. 4 for the example starter-generator device.
Figure 9:
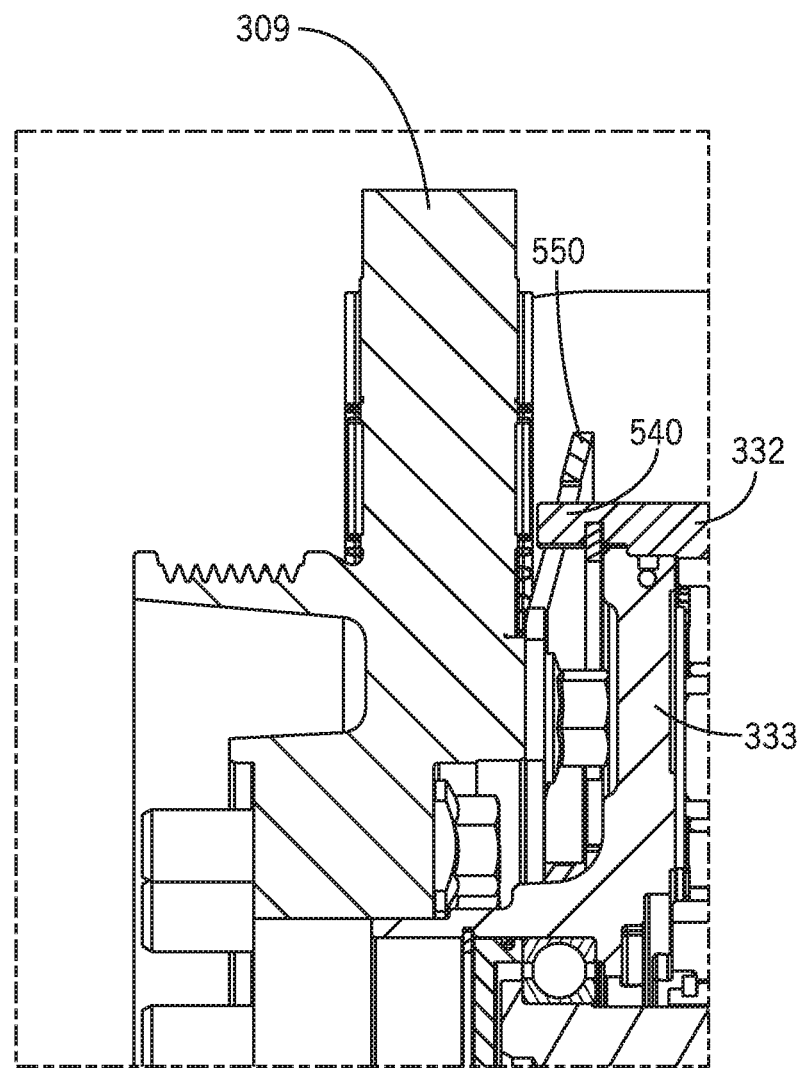
FIG. 9 is a sectional cross-sectional view of the power transmission assembly through line 9-9 of FIG. 8 for the example starter-generator device.

The reaction member 392, solenoid devices 410, 430, 450, 470, 490, 510, 530, and clutch arrangement 350 are described in more detail with reference to FIG. 8, which is an isometric view of these elements removed from the power transmission assembly 132. The view of FIG. 8 depicts a complete set of the solenoid devices 410, 430, 450, 470, 490, 510, 530 and clutch arrangement 350. The clutches 360, 370, 380 may be considered "shifting" or "dog" clutches that are actively actuated to modify power flow within the power transmission assembly 132.

As an example, FIG. 8 depicts the solenoid devices 410, 430 mounted on the reaction member 392 and coupled to the actuation pins 416, 436 via linkage assemblies 412, 432 to actuate a low clutch 360 of the clutch arrangement 350. As described in greater detail below, the low clutch 360 is repositionable between an engaged position and a disengaged position relative to the gear set 320 in order to modify the power transfer through the gear set 320. In one example, the low clutch 360 is particularly engaged during a cold engine start mode to enable the electric machine 134 to drive the engine 120 at a first power ratio.

In this example, the solenoid devices 410, 430 associated with the low clutch 360 are mounted to the undersides (or engine-sides) of the flanges 411, 431 on the outer perimeter 395 of the reaction member 392. The solenoid devices 410, 430 may be secured to the flanges 411, 431 in any suitable manner, such as by screws or other fasteners.

As introduced above, the solenoid devices 410, 430 are electromechanical actuators that generate linear movement at a respective armature by manipulating an induced magnetic field within the solenoid devices 410, 430. As the solenoid devices 410, 430 are activated or engaged, the armatures move out of the solenoid devices 410, 430. The solenoid devices 410, 430 are relatively low profile devices that enable a smaller overall package. Although two solenoid devices 410, 430 are provided in the depicted example, other embodiments may only have a single solenoid device or more than two solenoid devices.

The link members of the linkage assemblies 412, 432 extend between the armatures of the solenoid devices 410, 430 and the actuation pins 416, 436 and are pivotable about pivot members on the reaction member 392. As a result of the armatures moving out of the solenoid devices 410, 430, the link members are pivoted to move the low clutch 360 in the opposite axial direction, e.g., into the gear set 320. The arrangement of the linkage assemblies 412, 432 enables the solenoid devices 410, 430 to use leverage with the reaction member 392 to facilitate operation in a more compact and efficient manner, for example, by enabling advantageous use of beneficial lever ratios as a function of travel and force.

The solenoid devices 410, 430 associated with the low clutch 360 may include at least one connection element that enables commands and/or power between the respective solenoid devices 410, 430, the controller 150 (FIG. 1), and/or other sources. The connection elements may be wired or wireless connections. Positioning the solenoid devices 410, 430 around the outer perimeter 395 of the reaction member 392 may facilitate wire routing, if applicable, between the controller 150 and the connection elements.

The low clutch 360 is generally ring shaped with an inner perimeter that may be splined to facilitate mounting the low clutch 360 (e.g., on the spindle 351 or another element within or proximate to the gear set 320). A set of tabs may be positioned on the inner perimeter and define pin mounting holes that receive the actuation pins 416, 436. In particular, the pins 416, 436 are secured to the low clutch 360 at the tabs such that axial movement of the pins 416, 436 by the solenoid devices 410, 430 functions to axially reposition the low clutch 360. As discussed in greater detail below, the low clutch 360 additionally includes one or more teeth to engage elements of the gear set 320.

As a further example, solenoid devices 450, 470 may be mounted on the reaction member 392 and coupled to the actuation pins 456, 476 via linkage assemblies 452, 472 to actuate a mid clutch 370 of the clutch arrangement 350. As described in greater detail below, the mid clutch 370 is repositionable between an engaged position and a disengaged position relative to the gear set 320 in order to modify the power transfer through the gear set 320. In one example, the mid clutch 370 is particularly engaged during a warm engine start mode to enable the electric machine 134 to drive the engine 120 at a second power ratio.

In this example, the solenoid devices 450, 470 associated with the mid clutch 370 are mounted to the undersides (or engine-sides) of the flanges 451, 471 on the outer perimeter 395 of the reaction member 392. The solenoid devices 450, 470 may be secured to the flanges 451, 471 in any suitable manner, such as by screws or other fasteners.

As introduced above, the solenoid devices 450, 470 associated with the mid clutch 370 are electromechanical actuators that generate linear movement at a respective armature by manipulating an induced magnetic field within the solenoid devices 450, 470. As the solenoid devices 450, 470 are activated or engaged, the armatures move out of the solenoid devices 410, 430. The solenoid devices 450, 470 are relatively low profile devices that enable a smaller overall package. Although two solenoid devices 450, 470 are provided in the depicted example, other embodiments may only have a single solenoid device or more than two solenoid devices.

The link members of the linkage assemblies 452, 472 extend between the armatures of the solenoid devices 450, 470 and the actuation pins 456, 476 and are pivotable about pivot members on the reaction member 392. As a result of the armatures moving out of the solenoid devices 450, 470, the link members are pivoted to move the mid clutch 370 in the opposite axial direction, e.g., into the gear set 320. The arrangement of the linkage assemblies 452, 472 enables the solenoid devices 450, 470 to use leverage with the reaction member 392 to facilitate operation in a more compact and efficient manner, for example, by enabling advantageous use of beneficial lever ratios as a function of travel and force.

The solenoid devices 450, 470 may include at least one connection element that enables commands and/or power between the respective solenoid devices 450, 470, the controller 150 (FIG. 1), and/or other sources. The connection elements may be wired or wireless connections. Positioning the solenoid devices 450, 470 around the outer perimeter 395 of the reaction member 392 may facilitate wire routing, if applicable, between the controller 150 and the connection elements.

The mid clutch 370 is generally ring shaped having an outer perimeter that may be splined to facilitate mounting the mid clutch 370 (e.g., on the spindle 351 or another element within or proximate to the gear set 320). A set of tabs is positioned on the outer perimeter and define pin mounting holes that receive the actuation pins 436, 456. In particular, the pins 436, 456 are secured to the mid clutch 370 at the tabs such that axial movement of the pins 436, 456 by the solenoid devices 450, 470 functions to axially reposition the mid clutch 370. As discussed in greater detail below, the mid clutch 370 additionally includes one or more teeth extending from the first face to engage elements of the gear set 320. Additional details regarding the mid clutch 370, particularly regarding the engagement of the mid clutch 370 with the gear set 320, are provided below. The low clutch 360 and mid clutch 370 are sized such that the mid clutch 370 may be concentrically arranged within the low clutch 360. Other arrangements may be provided.

As a further example, solenoid devices 490, 510, 530 may be mounted on the reaction member 392 and coupled to the actuation pins 496, 516, 536 via linkage assemblies 492, 512, 532 to actuate a high clutch 380 of the clutch arrangement 350. As described in greater detail below, the high clutch 380 is repositionable between an engaged position and a disengaged position relative to the gear set 320 in order to modify the power transfer through the gear set 320. In one example, the high clutch 380 is particularly engaged during a boost mode to enable the electric machine 134 to drive the engine 120 at a third power ratio or during a generation mode to enable the engine 120 to drive the electric machine 134 at the third power ratio.

In this example, the solenoid devices 490, 510, 530 associated with the high clutch 380 are mounted to the electric machine-side of the flanges 491, 511, 531 on the outer perimeter 395 of the reaction member 392. The solenoid devices 490, 510, 530 may be secured to the flanges 491, 511, 531 in any suitable manner, such as by screws or other fasteners.

As introduced above, the solenoid devices 490, 510, 530 associated with the high clutch 380 are electromechanical actuators that generate linear movement at a respective armature by manipulating an induced magnetic field within the solenoid devices 490, 510, 530. As the solenoid devices 490, 510, 530 are engaged, the armatures move into the solenoid devices 490, 510, 530 to engage the high clutch 380. In one example, the solenoid devices 490, 510, 530 may be energized during disengagement and de-energized during engagement, although arrangements may vary. The solenoid devices 490, 510, 530 are relatively low profile devices that enable a smaller overall package. Although three solenoid devices 490, 510, 530 are provided in the depicted example, other embodiments may only have fewer solenoid devices (e.g., one or two) or more than three solenoid devices.

The link members of the linkage assemblies 492, 512, 532 extend between the armatures of the solenoid devices 490, 510, 530 and the actuation pins 496, 516, 536 and are pivotable about pivot members on the reaction member 392. As a result of the armatures moving out of the solenoid devices 490, 510, 530, the link members are pivoted to move the high clutch 380 in the opposite axial direction, e.g., towards the gear set 320. The arrangement of the linkage assemblies 492, 512, 532 enables the solenoid devices 490, 510, 530 to use leverage with the reaction member 392 to facilitate operation in a more compact and efficient manner, for example, by enabling advantageous use of beneficial lever ratios as a function of travel and force.

Additionally, the solenoid devices 490, 510, 530 associated with the high clutch 380 include at least one connection element that enables commands and/or power between the respective solenoid devices 490, 510, 530, the controller 150 (FIG. 1), and/or other sources. The connection elements may be wired or wireless connections. Positioning the solenoid devices 490, 510, 530 around the outer perimeter 395 of the reaction member 392 may facilitate wire routing, if applicable, between the controller 150 and the connection elements.

The high clutch 380 is generally ring shaped with a first (or electric machine-side) face, a second (or engine-side) face, an inner perimeter, and an outer perimeter. A set of tabs is positioned on the outer perimeter and define pin mounting holes that receive the actuation pins 496, 516, 536. In particular, the pins 496, 516, 536 are secured to the high clutch 380 at the tabs such that axial movement of the pins 496, 516, 536 by the solenoid devices 490, 510, 530 functions to axially reposition the high clutch 380. Although not shown in FIG. 9, the high clutch 380 may be secured into position and/or mounted on a sleeve, support element, and/or sliding hub. Additional details regarding the high clutch 380, particularly regarding the engagement of the high clutch 380 with the gear set 320, are provided below.

The operation of the gear set 320, clutch arrangement 350, and cam actuation apparatus 390 will now be described with reference to FIG. 8, which is cross-sectional views of the power transmission assembly 132. As introduced above, the gear set 320 of the power transmission assembly 132 is configured to transfer power between the pulley 210 and the drive plate 309. The gear set 320 is generally housed within an annular gear housing 311, portions of which, in this example, rotate with aspects of the gear set 320. Bearings 312 may be provided within the gear housing 311 to enable rotation of certain elements relative to stationary portions.

In the view of FIG. 8, a first side of the power transmission assembly 132 is oriented towards the electric machine 134, and a second side of the power transmission assembly 132 is oriented towards the engine 120. As noted above, the input shaft 310 may be directly connected to the power transfer element 135 with a fastener or bolt 308 or other mechanism; and in further examples, the input shaft 310 may be coupled through intermediate components, such as a flange or boss. It should be noted that, although the shaft 310 is described as an "input" shaft, it may transfer power both into and out of the power transmission assembly 132, depending on the mode, as described below. The input shaft 310 generally extends through the power transmission assembly 132 to define a primary axis of rotation 300.

The gear set 320 of the power transmission assembly 132, in this example, is a two-stage planetary gear set that enables the power transmission assembly 132 to interface with the electric machine 134 (e.g., via the power transfer belt arrangement 200) and the engine 120 (e.g., via coupling to the crank shaft 122 of the engine 120, as described in greater detail below). In some embodiments, the input shaft 310 may be considered part of the planetary gear set 320. Although one example configuration of the planetary gear set 320 is described below, other embodiments may have different configurations.

The planetary gear set 320 includes a first-stage sun gear 322 mounted for rotation on the input shaft 310. The first-stage sun gear 322 includes a plurality of teeth or splines that mesh with a set of first-stage planet gears 324 that circumscribe the first-stage sun gear 322. In one example, the first-stage planet gears 324 include a single circumferential row of one or more planet gears, although other embodiments may include radially stacked rows, each with an odd number of planet gears in the radial direction.

The first-stage planet gears 324 are supported by a first-stage planet carrier 326, which circumscribes the first-stage sun gear 322, as well as the input shaft 310, and is at least partially formed by first and second radially extending, axially facing carrier plates. The first-stage carrier plates of the first-stage planet carrier 326 include a row of mounting locations for receiving axles extending through and supporting the first-stage planet gears 324 for rotation. As such, in this arrangement, each of the planet axles respectively forms an individual axis of rotation for each of the first-stage planet gears 324, and the first-stage planet carrier 326 enables the set of first-stage planet gears 324 to collectively rotate about the first-stage sun gear 322.

The gear set 320 further includes a ring gear 332 that circumscribes the first-stage sun gear 322 and the first-stage planet gears 324. The ring gear 332 includes radially interior teeth that engage the teeth of the first-stage planet gears 324. As such, first-stage planet gears 324 extend between, and engage with, the first-stage sun gear 322 and the ring gear 332. In some embodiments, a ring gear cover 333 may be mounted within the interior of the ring gear 332. The ring gear cover 333 functions to at least partially enclose the gear set 320 within the gear housing 311.

As shown, the ring gear 332 is fixedly arranged within the interior of the rotatable gear housing 311, which as noted above is positioned on bearings 312 to rotate relative to the stationary housing element or spindle 351. With respect to the planetary gear set 320, the rotatable gear housing 311 and/or ring gear 332 may function as the power transfer element 133 relative to the engine 120. Additional details regarding the ring gear 332 are provided below. The ring gear 332 and/or rotatable gear housing 311 may be considered output and/or input elements of the power transmission assembly 132 to receive rotational input in both power flow directions. Additionally, the ring gear 332 and/or rotatable gear housing 311 may be considered part of the mounting arrangement 305 of the power transmission assembly 132 with respect to the engine 120, as discussed in greater detail below.

The gear set 320 further includes a second-stage sun gear 334 that is generally hollow and cylindrical, extending between first and second ends and circumscribing the input shaft 310. The first-stage planet carrier 326 has a splined engagement with, or is otherwise fixed to, the second-stage sun gear 334 proximate to the second end. Additionally, the second-stage sun gear 334 may include a series of splines that mesh with a set of second-stage planet gears 340. The second-stage planet gears 340 are supported by a second-stage planet carrier 342 formed by first and second planet carrier plates. The second-stage planet gears 334 are positioned to additionally engage with the ring gear 332. The second-stage planet gears 334 each have an axle that extends between the two carrier plates that enable each planet gear 340 to rotate relative to the planet carrier 342 about the respective axle. As such, the second-stage planet gears 340 are positioned in between, and engage with each of, the second-stage sun gear 334 and the ring gear 332. Each second-stage planet gear 334 has the same or a different number of teeth relative to a corresponding first-stage planet gear 324.

As introduced above, the clutch arrangement 350 of the power transmission assembly 132 configured to selectively engage and disengage with various components of the planetary gear set 320 to modify the power flow according to the modes noted above. The cam actuation apparatus 390 operates to actuate the clutch arrangement 350. The view of FIG. 8 additionally depicts the axial flange 398 that facilitates mounting the reaction member 392 of the cam actuation apparatus 390 to enable interaction between the cam actuation apparatus 390 and the clutch arrangement 350, and thus, between the clutch arrangement 350 and the gear set 320. Actuation mechanisms other than those depicted or described may be provided.

In the view of FIG. 8, the low clutch 360 is in the disengaged position and configured to be actuated by the solenoid devices 410, 430 via the linkage assemblies 412, 432 and actuation pins 416, 436. As noted above, the low clutch 360 may be mounted on a stationary spindle 351 (or other stationary housing element).

Although not shown in the cross-sectional view of FIG. 8, the solenoid devices 410, 430 may be engaged to pivot the link members of linkage assemblies 412, 432 about the pivot members on the first face 393 of the reaction member 392 such that the actuation pins 416, 436 axially reposition the low clutch 360 into the gear set 320. In this example, the solenoid devices 410, 430 are energized for engagement. Upon engagement with the gear set 320, the low clutch 360 is configured to lock the second-stage planet carrier 342 to a stationary housing element such as spindle 351, i.e., to ground the second-stage planet carrier 342 and prevent rotation. With the low clutch 360 in the engaged position and the mid and high clutches 370, 380 maintained in the disengaged positions, the power transfer assembly 132 is configured to operate in the cold engine start mode.

In the cold engine start mode, the engine 120 may be initially inactive, and activation of the ignition by an operator in the cabin 108 of the work vehicle 100 energizes the electric machine 134 to operate as a motor. In particular and additionally referring to FIG. 3, the electric machine 134 rotates the pulley 220 in the first clock direction D1, thereby driving the belt 230 and pulley 210 in the first clock direction D1. The pulley 210 drives the input shaft 310, in the first clock direction D1. Rotation of the input shaft 310 drives rotation of the first-stage sun gear 322, and in turn, rotation of the first-stage sun gear 322 drives rotation of the first-stage planet gears 324. The first-stage planet gears 324 drive the first-stage planet carrier 326, which as noted above is splined with the second-stage sun gear 334. As a result, the first-stage planet carrier 326 drives the second-stage sun gear 334 and thus the second-stage planet gears 340. As noted above, the second-stage planet carrier 342 is grounded by the low clutch 360. As such, rotation of the second-stage planet gears 340 operates to drive the ring gear 332. Since the number of second-stage planet gears 340 in the power flow path is an odd number (e.g., 1), the second-stage planet gears 340 drive the ring gear 332 in the opposite direction (e.g., the second clock direction D2) relative to the second-stage sun gear 334 rotating in the first clock direction D1. As noted above, the ring gear 332 functions as part of the power transfer element 133 to interface with the drive plate 309 mounted to the engine 120 to drive and facilitate engine start. In effect, during the cold engine start mode, the power transmission assembly 132 operates as a sun-in, ring-out configuration.

In one example, the power transmission assembly 132 provides a 15:1 gear ratio in the power flow direction of the cold engine start mode. In other embodiments, other gear ratios (e.g., 10:1-30:1) may be provided. Considering a 4:1 gear ratio from the power transfer belt arrangement 200, a resulting 60:1 gear ratio (e.g., approximately 40:1 to about 120:1) may be achieved for the starter-generator device 130 between the electric machine 134 and the engine 120 during the cold engine start mode. As such, if for example the electric machine 134 is rotating at 10,000 RPM, the drive plate 309 mounted to the engine 120 rotates at about 100-150 RPM. In one example, the power transmission assembly 132 may deliver a torque of approximately 3000 Nm to the engine 120. Accordingly, the electric machine 134 may thus have normal operating speeds with relatively lower speed and higher torque output for cold engine start up.

In order to transition into another mode, the solenoid devices 410, 430 are disengaged (e.g., de-energized, in this example) and the low clutch 360 may be moved back into the disengaged position. This may be implemented in a number of ways. In one example, a spring (not shown) is may be provided on the second side 362 of the low clutch 360 such that, upon removal of the force from the solenoid devices 410, 430, the spring biases the low clutch 360 back into the disengaged position. Other mechanisms may be provided.

Although not shown in FIG. 8, the solenoid devices 450, 470 may be engaged to pivot the link members of the linkage assemblies 452, 472 about the pivot members on the first face 393 of the reaction member 392 such that the actuation pins 456, 476 axially reposition the mid clutch 370 into the gear set 320. In this example, the solenoid devices 450, 470 are energized for engagement. Upon engagement of the mid clutch 370, the first-stage planet carrier 326 is locked to the stationary housing portion such as spindle 351, i.e., to ground the first-stage planet carrier 326 and prevent rotation.

When the mid clutch 370 is engaged and the low and high clutches 360, 380 are disengaged, the power transmission assembly 132 is configured to operate in the warm engine start mode. In the warm engine start mode, the engine 120 may be initially inactive or active. In any event, the controller 150 energizes the electric machine 134 to operate as a motor. In particular and additionally referring to FIG. 3, the electric machine 134 rotates the pulley 220 in the first clock direction D1, thereby driving the belt 230 and pulley 210 in the first clock direction D1. The pulley 210 drives the input shaft 310, in the first clock direction D1. Since the first-stage sun gear 322 is mounted on the input shaft 310, rotation of the input shaft 310 also rotates the first-stage sun gear 322. In turn, rotation of the first-stage sun gear 322 drives rotation of the first-stage planet gears 324. Since the first-stage planet carrier 326 and second-stage sun gear 334 are grounded, rotation of the first-stage planet gears 324 drives rotation of the ring gear 332. Since the number of first-stage planet gears 324 in the power flow path is an odd number (e.g., 1), the first-stage planet gears 324 drive the ring gear 332 in the opposite direction (e.g., the second clock direction D2) relative to the input shaft 310 and the first-stage sun gear 322 rotating in the first clock direction D1. As noted above, the ring gear 332 functions as the power transfer element 133 to interface with the drive plate 309 mounted to the engine 120 to drive and facilitate engine start. In effect, during the warm engine start mode, the power transmission assembly 132 operates as a sun-in, ring-out configuration, albeit at a lower gear ratio as compared to the cold engine start mode.

In one example, the power transmission assembly 132 provides a 4:1 gear ratio in the power flow direction of the warm engine start mode. In other embodiments, other gear ratios (e.g., 3:1-7:1) may be provided. Considering a 4:1 gear ratio from the power transfer belt arrangement 200, a resulting 16:1 gear ratio (e.g., approximately 12:1 to about 28:1) may be achieved for the starter-generator device 130 between the electric machine 134 and the engine 120 during the warm engine start mode. As such, if for example the electric machine 134 is rotating at 10,000 RPM, the drive plate 309 mounted to the engine 120 rotates at about 600-700 RPM. In one example, the torque output of the power transmission assembly 132 for the engine 120 is approximately 400-600 Nm. Accordingly, the electric machine 134 may thus have normal operating speeds with a relatively lower speed and higher torque output for engine start up.

In order to transition into another mode, the solenoid devices 450, 470 are disengaged (de-energized, in this example) and the mid clutch 370 may be moved back into the disengaged position. This may be implemented in a number of ways. In one example, a spring (not shown) is may be provided on the second side of the mid clutch 370 such that, upon removal of the force from the solenoid devices 450, 470, the spring biases the mid clutch 370 back into the disengaged position. Other mechanisms may be provided.

Although not shown in FIG. 8, the solenoid devices 490, 510, 530 may be engaged to pivot the link members of linkage assemblies 492, 512, 532 about the pivot members on the first face 393 of the reaction member 392 such that the actuation pins 496, 516, 536 axially reposition the high clutch 380 into the gear set 320. In this example, the solenoid devices 490, 510, 530 are energized for disengagement and de-energized for engagement. As such, to transition into the disengaged position, current to the solenoid devices 490, 510, 530 may be discontinued and a spring within the solenoid devices 490, 510, 530, on the high clutch 380, or on the sliding hub 388 may urge the into the engaged position. Upon engagement of the high clutch 380, sliding hub 388 engages to lock the input shaft 310 and the ring gear cover 333 to rotate together.

With the high clutch 380 in the engaged position and low and mid clutch 360, 370 in disengaged positions, the power transmission assembly 132 is configured to operate in the boost mode or generation mode. In order to transition into another mode, the solenoid devices 490, 510, 530 are disengaged (e.g., energized, in this example) and the high clutch 380 may be moved back into the disengaged position.

In the boost mode, the engine 120 is active and the electric machine 134 operates as a motor. In particular and additionally referring to FIG. 3, the electric machine 134 rotates the pulley 220 in the first clock direction D1, thereby driving the belt 230 and pulley 210 in the first clock direction D1. The pulley 210 drives the element 135, and thus the input shaft 310, in the first clock direction D1. Rotation of the input shaft 310 drives rotation of the first-stage sun gear 322, and in turn, rotation of the first-stage sun gear 322 drives rotation of the first-stage planet gears 324.

As noted above, the input shaft 310 is locked to the ring gear 332 by the high clutch 380 when engaged. As a result, rotation of the input shaft 310 drives the ring gear 332, as well as of the first-stage sun gear 322, the first-stage planet gears 324, the first-stage planet carrier 326, the second-stage sun gear 334, and the second-stage planet gears 340, about the primary rotational axis 300. In effect, the gear set 320 rotates as a unit about the primary rotational axis 300. Since the other components of the planetary gear set 320 rotate with the input shaft 310, the ring gear 332 is driven in the same second clock direction D2. As noted above, the ring gear 332 functions as part of the power transfer element 133 to interface with the drive plate 309 mounted to the engine 120 to drive the engine 120. In effect, during the boost mode, the power transmission assembly 132 operates as a sun-in, ring-out configuration.

In one example, the power transmission assembly 132 provides a 1:1 gear ratio in the power flow direction of the boost mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the boost mode. As such, if for example the electric machine 134 is rotating at 10,000 RPM, the drive plate 309 mounted to the engine 120 rotates at about 2500 RPM. Accordingly, the electric machine 134 may thus have normal operating speeds while providing an appropriate boost speed to the engine 120.

The power transmission assembly 132 has the same configuration to provide a generation mode as in the boost mode. However, in the generation mode, the engine 120 drive the power transmission assembly 132 and thus the electric machine 134.

For the generation mode (and subsequent to the engine start modes and/or the boost mode), the engine 120 begins to accelerate above rotational speed provided by power transmission assembly 132, and the electric machine 134 is commanded to decelerate and to cease providing torque to power transmission assembly 132. After the engine 120 has stabilized to a sufficient speed and the electric machine 134 has sufficiently decelerated or stopped, the high clutch 380 is engaged as described above to operate the power transmission assembly 132 in the generation mode.

In the generation mode, the engine 120 rotates the drive plate 309 engaged with the ring gear 332, thus driving the ring gear 332 in the second clock direction D2. The ring gear 332 drives the first-stage planet gears 324 and the second-stage planet gears 340, which respectively drive the first-stage sun gear 322 and the second-stage sun gear 334, and further driving input shaft 310. Therefore, as the ring gear 332 rotates in the second clock direction D2, the input shaft 310 is driven and similarly rotates in the second clock direction D2 at the same rate of rotation. As noted above, the input shaft 310 is connected with and provides output power to the electric machine 134 in the second clock direction D2 via the power transfer belt arrangement 200. In effect, during the generation mode, the power transmission assembly 132 operates as a ring-in, sun-out configuration.

In one example, the power transmission assembly 132 provides a 1:1 gear ratio in the power flow direction of the generation mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the generation mode. As a result, the electric machine 134 may thus have normal operating speeds in both power flow directions with relatively low torque output during power generation.

Additional details regarding the interaction of the power transmission assembly 132 and the engine 120 will now be provided. In particular, the power transmission assembly 132 includes the mounting arrangement 305 that supports and rotationally couples the power transmission assembly 132 to the engine 120.

Referring again to FIG. 8 and as introduced above, the ring gear 332 is integral with the cylindrical rotatable gear housing 311. The ring gear 332 includes a number of castellations 540 that extend radially into a flex plate 550 that is mounted to a drive plate 309. The drive plate 309 is mounted to the crank shaft of the engine 120 (FIG. 3). A closer view of the engagement of a ring gear castellation 540 with the flex plate 550 mounted on the drive plate 309 is provided by the view of FIG. 9. In effect, this arrangement 305 provides a direct coupling (e.g., without bolts) between the engine 120 (FIG. 3) and the power transmission assembly 132.

Figure 10:
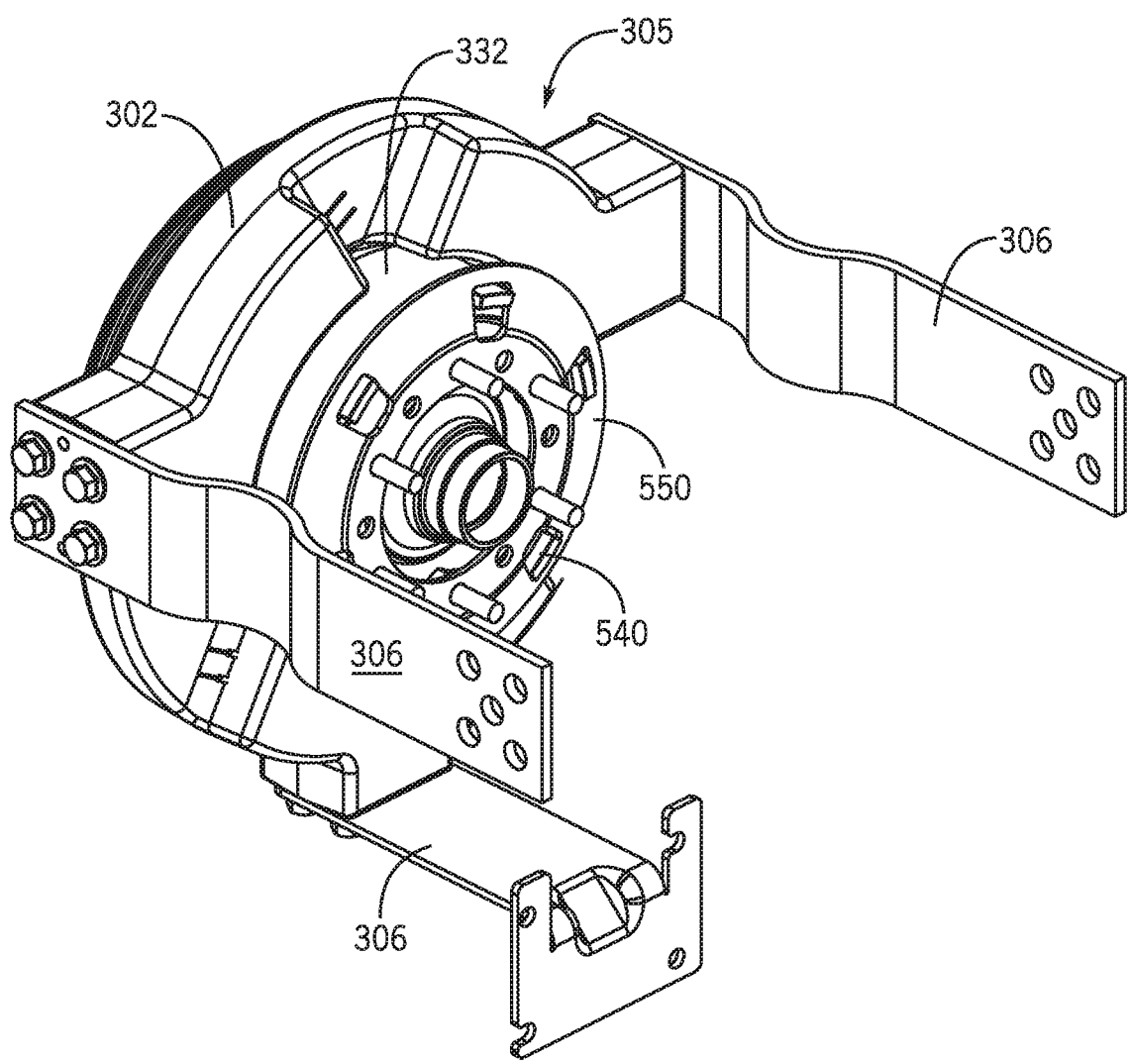
FIG. 10 is a partial isometric side view of a power transmission assembly of the example starter-generator device that may be implemented in the work vehicle of FIG. 1.

Reference is briefly made to FIG. 10, which is an isometric engine-side view of the power transmission assembly 132 with the drive plate 309 removed. As introduced above, the mounting arrangement 305 includes a set of leg members 306 extending from the stationary housing portion 303. The leg members 306 are sized and shaped such that the drive plate 309 (not shown in FIG. 10) mounted to the flex plate 550 may engage with the engine crank shaft. The distal ends of the leg members 306 may be secured to the engine 120 with bolts or other fasteners (not shown). In effect, the leg members 306 function to provide stationary support and as a reaction member for to the power transmission assembly 132 relative to the engine 120.

Figure 11:
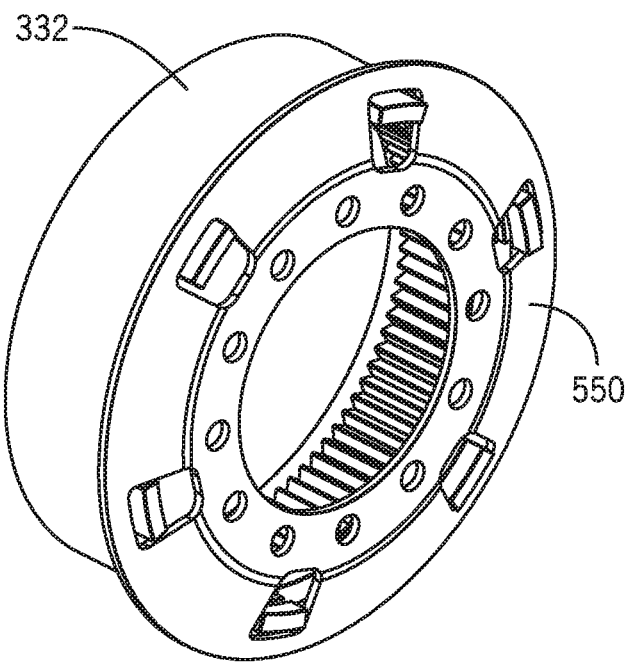
FIG. 11 is an isometric view of a ring gear and a flex plate removed from the power transmission assembly of FIG. 4 for the example starter-generator device.
Figure 12:
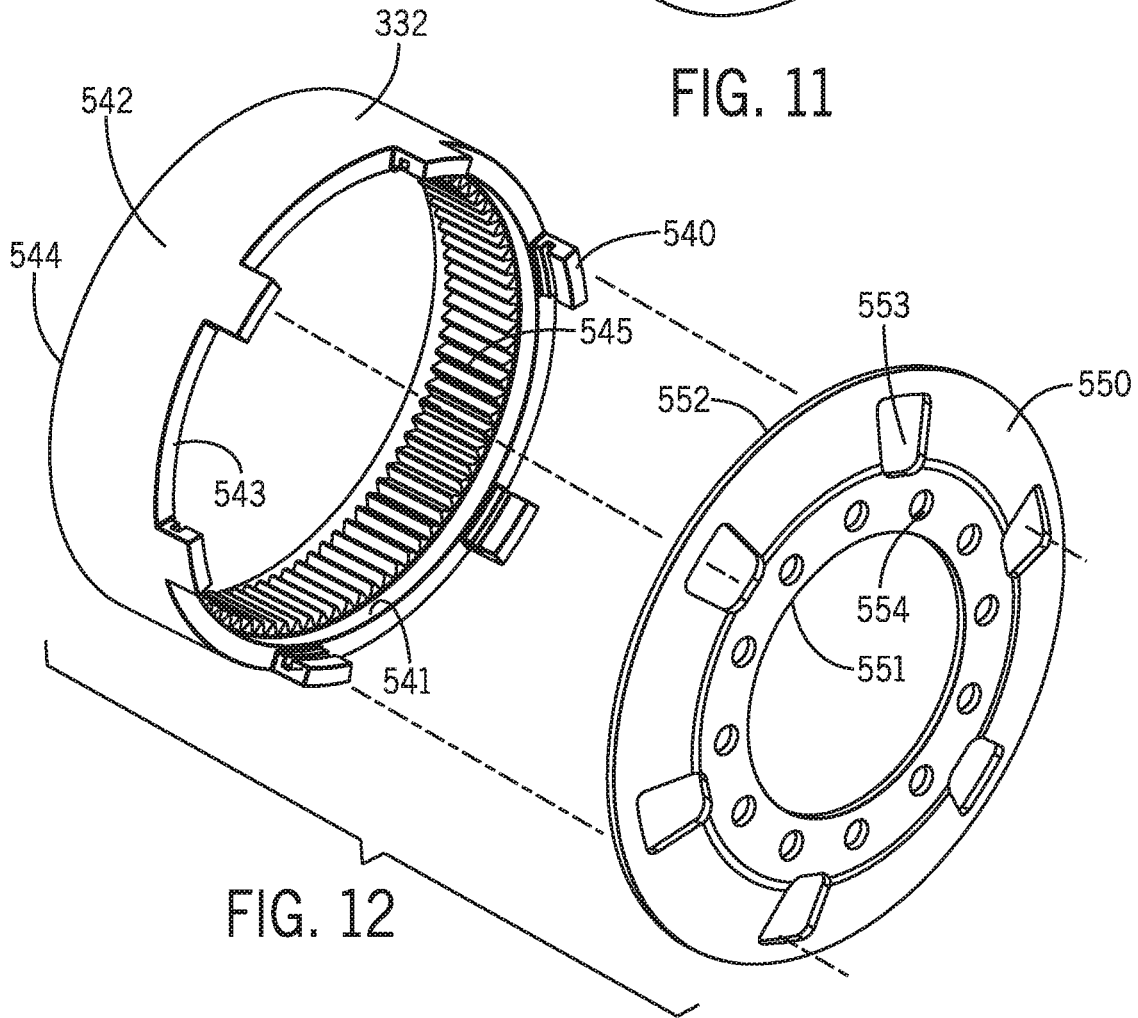
FIG. 12 is an exploded isometric view of the ring gear and the flex plate of FIG. 11 for the example starter-generator device.

The views of FIGS. 11 and 12 are isometric views of the ring gear 332 and the flex plate 550. As best shown in FIG. 12, the ring gear 332 is an integral (one-piece) member with an inner surface 541, an outer surface 542, a first (electric machine-side) perimeter surface 543, and a second (engine-side) perimeter surface 544. As introduced above, splines 545 are formed in the inner surface 541 to order to engage with the first-stage planet gears 324 and the second-stage planet gears 340. The castellations 540 extend in a radial direction about the circumference of the second perimeter surface 544. In one example, the ring gear 332 has six castellations 540, although other examples may have different numbers of castellations 540.

The flex plate 550 may also be formed by an integral member in one example. As shown, the flex plate 550 is generally ring-shaped with an inner perimeter 551 and an outer perimeter 552. The flex plate 550 includes a circumferential row of engagement apertures 553 configured to receive the castellations 540 of the ring gear 332 when assembled. The engagement apertures 553 are sized and shaped to accommodate the castellations 540 in order to secure the castellations 540 in the circumferential direction, while enabling relatively easy radial and axial access during mounting and dismounting of the power transmission assembly 132 relative to the engine 120.

The flex plate 550 further includes a circumferential row of mounting holes 554. In this example, the mounting holes 554 are radially interior to the engagement apertures 553. As described below, the mounting holes 554 are utilized the mount the flex plate 550 to the drive plate 309.

The flex plate 550 may have a slight bend or slant in the radial direction towards the ring gear 332 from the inner perimeter 551 to the outer perimeter 552 (or a slight bend or slant in the radial direction away from the ring gear 332 from the outer perimeter 552 to the inner perimeter 551). The provides a radial resiliency to the flex plate 550 that accommodates some amount of relative radial movement between the power transmission assembly 132 and the engine 120. The resiliency of the flex plate 550 may be turned to balance insertion load relative to torsional application loads. The flex plate 550 may also provide an anti-rattle and/or anti-noise function for the power transmission assembly 132.

Figure 13:
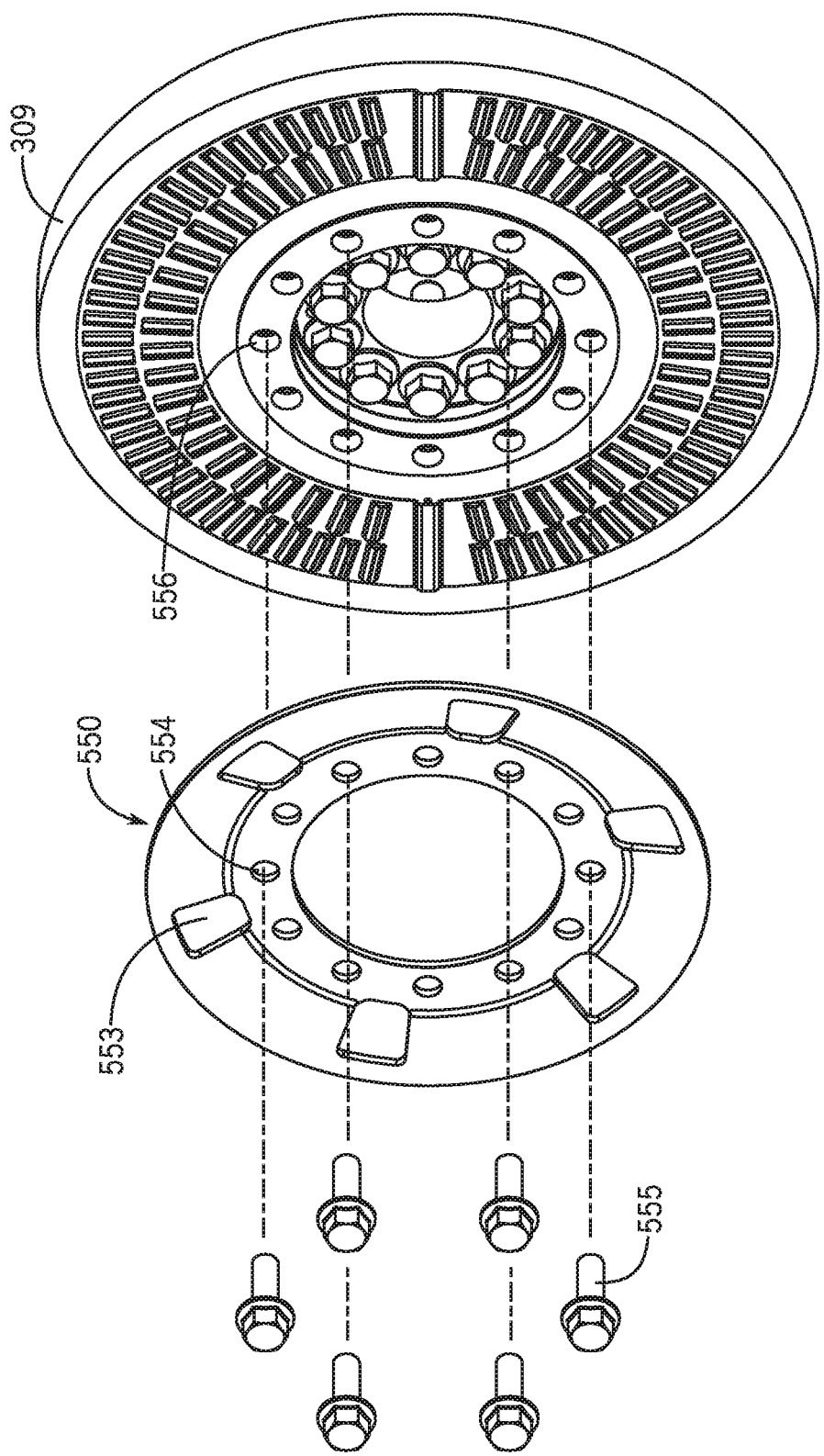
FIG. 13 is an exploded isometric view of portions of a mounting arrangement removed from the power transmission assembly of FIG. 4 for the example starter-generator device.
Figure 14:
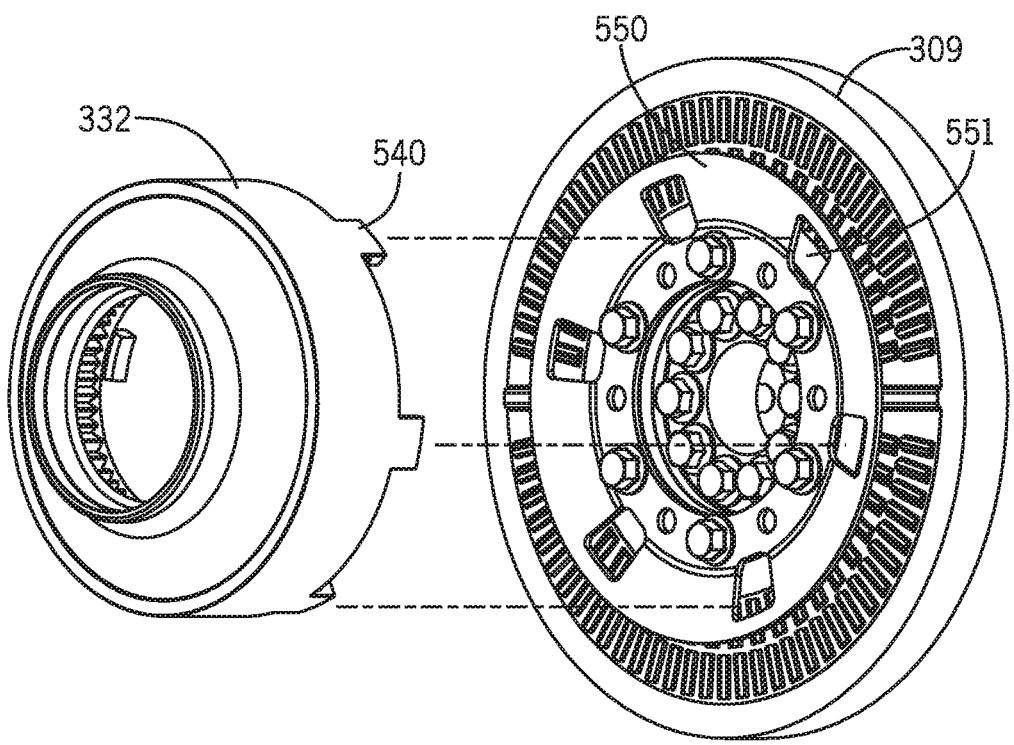
FIG. 14 is a partially exploded isometric view of portions of the mounting arrangement removed from the power transmission assembly of FIG. 4 for the example starter-generator device.
Figure 15:
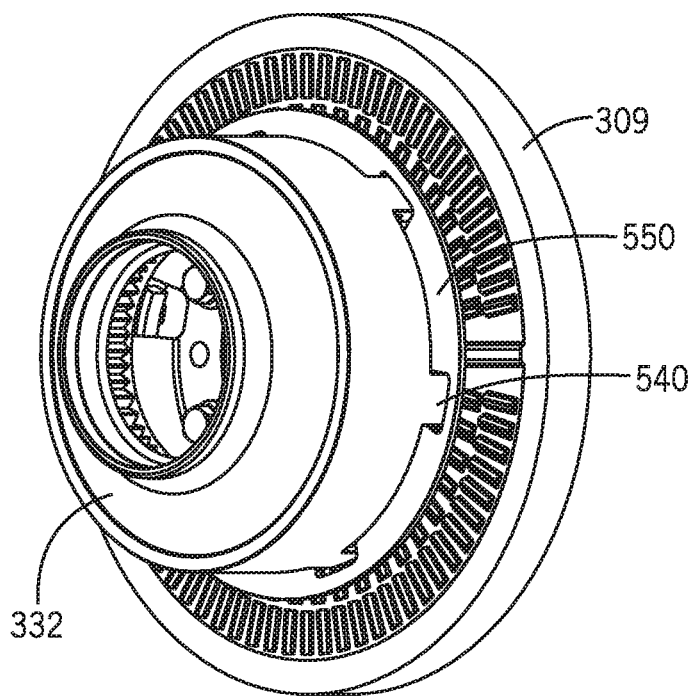
FIG. 15 is an isometric view of portions of the mounting arrangement removed from the power transmission assembly of FIG. 4 for the example starter-generator device.

Reference is now made to FIG. 13, which is an exploded isometric view of the flex plate 550 and the drive plate 309. As introduced above, the flex plate 550 includes a series of mounting holes 554 configured to receive fasteners 555 to secure the flex plate 550 to the drive plate 309.

In this example, the drive plate 309 is a torsional damper. As such, the torsional damper 309 functions dampen vibrations at the crank shaft of the engine 120. The torsional damper 309 may utilize fluid or springs to dissipate vibrations from the crank shaft of the engine and/or the ring gear 332. In some examples, the drive plate 309 may be a separate element from the torsional damper.

As also shown in FIG. 13, the drive plate 309 includes a series of mounting holes 556 to receive the fasteners 555 and secure the flex plate 550 to the drive plate 309. Accordingly (and additionally referring to FIGS. 14 and 15), in order to couple the ring gear 332 to the drive plate 309, the flex plate 550 is initially secured to the drive plate 309 with the fasteners 555. The castellations 540 of the ring gear 332 are then inserted into the engagement apertures 553 of the flex plate 550. Subsequently, the drive plate 309 is mounted to the crank shaft of the engine 120 (FIG. 3) and the mounting leg members 306 (FIG. 10) are also secured to the engine 120 (FIG. 3). In this manner, the ring gear 332 of the transmission assembly 132 may be rotationally coupled to the engine 120 for torque transfer without requiring a bolt or other type of fastener for the ring gear 332.

Thus, various embodiments of the vehicle electric system have been described that include an integrated starter-generator device. Various transmission assemblies may be included in the device, thus reducing the space occupied by the system. The transmission assembly may provide multiple speeds or gear ratios and transition between speeds/gear ratios. One or more clutch arrangements may be used to selectively apply torque to the gear set of the transmission assembly in both power flow directions. Direct mechanical engagement with the engine shaft reduces the complexity and improves reliability of the system. Using planetary gear sets in the transmission assembly provides high gear reduction and torque capabilities with reduced backlash in a compact space envelope. As a result of the bi-directional nature of the power transmission assembly, the power transfer belt arrangement may be implemented with only a single belt tensioner, thereby providing a relatively compact and simple assembly. Additionally, by using the power transfer belt arrangement with belt and pullies to couple together and transfer power between the electric machine and the power transmission assembly, instead of directly connecting and coupling the electric machine to the power transmission assembly, the electric machine may be mounted apart from the transmission assembly to better fit the engine in a vehicle engine bay. Additionally, by using the belt and pullies to couple the electric machine to the power transmission assembly, an additional gear ratio (e.g., a 4:1 ratio) may be achieved. Embodiments discussed above include a double planetary gear set, sun in, ring out configuration to provide warm and cold engine start modes and a ring in, sun out configuration to provide a generation mode. As such, a four-mode assembly may be provided. The embodiments above further enable the mounting of the power transmission assembly without the use of bolts or fasteners in order to simplify and improve assembly and performance. Additionally, the mounting arrangement between the power transmission assembly and the engine may be implemented with torsional dampers and/or anti-rattle features to improve operation.

Also, the following examples are provided, which are numbered for easier reference.

1. A combination starter-generator device for a work vehicle having an engine, the starter-generator device comprising: an electric machine; a gear set configured to receive rotational input from the electric machine and from the engine and to couple the electric machine and the engine in a first power flow direction and a second power flow direction, the gear set configured to operate in one of at least a first gear ratio, a second gear ratio, or a third gear ratio in the first power flow direction and at least a fourth gear ratio in the second power flow direction, wherein the gear set includes a ring gear formed by a cylindrical base with a perimeter surface facing the engine and a circumferential row of castellations extending in a radial direction from the perimeter surface; and a mounting arrangement comprising a drive plate configured to be secured to a crank shaft of the engine and a flex plate mounted to the drive plate, wherein the flex plate includes a row of engagement apertures configured to receive the castellations of the ring gear to rotationally couple the ring gear to the engine via the mounting arrangement.

2. The combination starter-generator device of example 1, wherein the mounting arrangement further comprises a primary housing that at least partially encloses the gear set and at least one mounting leg extending from the primary housing for mounting the combination starter-generator device to the engine.

3. The combination starter-generator device of example 2, wherein the at least one mounting leg includes three mounting legs.

4. The combination starter-generator device of example 2, wherein the drive plate includes a torsional damper configured to dampen vibrations.

5. The combination starter-generator device of example 4, wherein the cylindrical base and castellations of the ring gear are integrally formed.

6. The combination starter-generator device of example 5, wherein the castellations of the ring gear and the engagement apertures of the flex plate enable circumferential engagement between the ring gear and the flex plate without the ring gear being fixedly secured to the flex plate in a radial direction.

7. The combination starter-generator device of example 1, further comprising a belt and pulley coupled to the gear set and the electric machine, wherein input power in the first power flow direction is conveyed from the electric machine to the gear set by the belt and pulley, and wherein in the first power flow direction the belt and pulley rotate in the first clock direction and in the second power flow direction the belt and pulley rotate in the second clock direction.

8. The combination starter-generator device of example 7, further comprising a single belt tensioner applying tension to a first side of the belt in both the first power flow direction and the second power flow direction.

9. The combination starter-generator device of example 8, wherein the gear set comprises a compound epicyclic gear train including the ring gear, an input shaft, first-stage and second-stage sun gears, first-stage and second-stage planet gears, and first-stage and second-stage carriers with the first-stage planet carrier splined to the second-stage sun gear, wherein rotational power from the electric machine moves in the first power flow direction from the sun gear to the ring gear to the engine, and wherein rotational power from the engine moves in the second power flow direction from the ring gear to the sun gear to the electric machine.

10. The combination starter-generator device of example 9, further comprising: at least one clutch selectively coupled to the gear set to effect the first, second, and third gear ratios in the first power flow direction and the fourth gear ratio in the second power flow direction; and an actuation assembly including at least one electromechanical solenoid device configured to selectively shift the at least one clutch from a disengaged position in which the at least one clutch is decoupled from the gear set into an engaged position in which the at least one clutch is coupled to the gear set.

11. The combination starter-generator device of example 10, wherein the at least one clutch includes at least a first clutch, a second clutch, and a third clutch, each configured as a dog clutch to selectively engage the gear set.

12. The combination starter-generator device of example 11, wherein, in a cold engine start mode, the first clutch is in the engaged position to ground the second-stage planet carrier and the second and third clutches are in the disengaged positions, and further, rotational power from the electric machine moves in the first power flow direction from the input shaft, to the first-stage sun gear, to the first stage-planet gears, to the first-stage planet carrier, to the second-stage sun gear, to the second-stage planet gears, and to the ring gear out to the engine at the first gear ratio; and wherein, in a warm engine start mode, the second clutch is in the engaged position to ground the first-stage planet carrier and the first and third clutches are in the disengaged positions, and further, the rotational power from the electric machine moves in the first power flow direction from the input shaft, to the first-stage sun gear, to the first stage-planet gears, and to the ring gear out to the engine at the second gear ratio.

13. The combination starter-generator device of example 12, wherein, in a boost mode, the third clutch is in the engaged position to couple the input shaft to the ring gear and the first and second clutches are in the disengaged positions, and further, the rotational power from the electric machine moves in the first power flow direction from the input shaft, to the first-stage and second-stage sun gears, to the first-stage and second-stage planet gears, and to the ring gear out to the engine at the third gear ratio; and wherein, in a generation mode, the third clutch is in the engaged position to couple the input shaft to the ring gear and the first and second clutches are in the disengaged positions, and further, rotational power from the engine moves in the second power flow direction from the ring gear, to the first-stage and second-stage planet gears, to the first-stage and second-stage sun gears, and to the input shaft out to the electric machine at the fourth gear ratio.

14. The combination starter-generator device of example 13, wherein each of the third gear ratio and the fourth gear ratio is a 1:1 ratio through the gear set, and wherein the first gear ratio is greater than the second gear ratio, and the second gear ratio is greater than the third gear ratio.

15. A drivetrain assembly for a work vehicle, comprising: an engine; an electric machine; a gear set configured to receive rotational input from the electric machine and from the engine and to couple the electric machine and the engine in a first power flow direction and a second power flow direction, the gear set configured to operate in one of at least a first gear ratio, a second gear ratio, or a third gear ratio in the first power flow direction and at least the third gear ratio in the second power flow direction, wherein the gear set includes a ring gear formed by a cylindrical base with a perimeter surface facing the engine and a circumferential row of castellations extending in a radial direction from the perimeter surface; at least one clutch selectively coupled to the gear set to effect the first, second, and third gear ratios in the first power flow direction and the fourth gear ratio in the second power flow direction; an actuation assembly configured to selectively shift the at least one clutch from a disengaged position in which the at least one clutch is decoupled from the gear set into an engaged position in which the at least one clutch is coupled to the gear set; and a mounting arrangement comprising a drive plate configured to be secured to a crank shaft of the engine and a flex plate mounted to the drive plate, wherein the flex plate includes a row of engagement apertures configured to receive the castellations of the ring gear to rotationally couple the ring gear to the engine via the mounting arrangement.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A combination starter-generator device for a work vehicle having an engine, the starter-generator device comprising:
    an electric machine;
    a gear set configured to receive rotational input from the electric machine and from the engine and to couple the electric machine and the engine in a first power flow direction and a second power flow direction, the gear set configured to operate in one of at least a first gear ratio, a second gear ratio, a third gear ratio, or a fourth gear ratio, wherein the first gear ratio, the second gear ratio, and the third gear ratio are in the first power flow direction and the fourth gear ratio is in the second power flow direction, wherein the gear set includes a ring gear formed by a cylindrical base with a perimeter surface facing the engine and a circumferential row of castellations extending in an axial direction from the perimeter surface, wherein the cylindrical base and castellations of the ring gear are integrally formed; and
    a mounting arrangement comprising a drive plate configured to be secured to a crank shaft of the engine and a flex plate mounted to the drive plate, wherein the flex plate includes a row of engagement apertures configured to receive the castellations of the ring gear to rotationally couple the ring gear to the engine via the mounting arrangement.

2. The combination starter-generator device of claim 1, wherein the mounting arrangement further comprises a primary housing that at least partially encloses the gear set and at least one mounting leg extending from the primary housing for mounting the combination starter-generator device to the engine.

3. The combination starter-generator device of claim 2, wherein the at least one mounting leg includes three mounting legs.

4. The combination starter-generator device of claim 2, wherein the drive plate includes a torsional damper configured to dampen vibrations.

5. The combination starter-generator device of claim 1, wherein the castellations of the ring gear and the engagement apertures of the flex plate enable circumferential engagement between the ring gear and the flex plate without the ring gear being fixedly secured to the flex plate in a radial direction.

6. A combination starter-generator device for a work vehicle having an engine, the starter-generator device comprising:
    an electric machine;
    a gear set configured to receive rotational input from the electric machine and from the engine and to couple the electric machine and the engine in a first power flow direction and a second power flow direction, the gear set configured to operate in one of at least a first gear ratio, a second gear ratio, a third gear ratio, or a fourth gear ratio, wherein the first gear ratio, the second gear ratio, and the third gear ratio are in the first power flow direction and the fourth gear ratio is in the second power flow direction, wherein the gear set includes a ring gear formed by a cylindrical base with a perimeter surface facing the engine and a circumferential row of castellations extending in an axial direction from the perimeter surface;
    a mounting arrangement comprising a drive plate configured to be secured to a crank shaft of the engine and a flex plate mounted to the drive plate, wherein the flex plate includes a row of engagement apertures configured to receive the castellations of the ring gear to rotationally couple the ring gear to the engine via the mounting arrangement; and
    a belt and pulley coupled to the gear set and the electric machine,
    wherein input power in the first power flow direction is conveyed from the electric machine to the gear set by the belt and pulley, and wherein in the first power flow direction the belt and pulley rotate in the first clock direction and in the second power flow direction the belt and pulley rotate in the second clock direction.

7. The combination starter-generator device of claim 6, further comprising a single belt tensioner applying tension to a first side of the belt in both the first power flow direction and the second power flow direction.

8. The combination starter-generator device of claim 7, wherein the gear set comprises a compound epicyclic gear train including the ring gear, an input shaft, first-stage and second-stage sun gears, first-stage and second-stage planet gears, and first-stage and second-stage carriers with the first-stage planet carrier splined to the second-stage sun gear,
    wherein rotational power from the electric machine moves in the first power flow direction from the first-stage sun gear to the ring gear to the engine, and wherein rotational power from the engine moves in the second power flow direction from the ring gear to the first-stage sun gear to the electric machine.

9. The combination starter-generator device of claim 8, further comprising:
    at least one clutch selectively coupled to the gear set to effect the one of at least the first, second, and third gear ratios in the first power flow direction and the fourth gear ratio in the second power flow direction; and
    an actuation assembly including at least one electromechanical solenoid device configured to selectively shift the at least one clutch from a disengaged position in which the at least one clutch is decoupled from the gear set into an engaged position in which the at least one clutch is coupled to the gear set.

10. The combination starter-generator device of claim 9, wherein the at least one clutch includes at least a first clutch, a second clutch, and a third clutch, each configured as a dog clutch to selectively engage the gear set.

11. The combination starter-generator device of claim 10, wherein, in a cold engine start mode, the first clutch is in the engaged position to ground the second-stage planet carrier and the second and third clutches are in the disengaged positions, and further, rotational power from the electric machine moves in the first power flow direction from the input shaft, to the first-stage sun gear, to the first stage-planet gears, to the first-stage planet carrier, to the second-stage sun gear, to the second-stage planet gears, and to the ring gear out to the engine at the first gear ratio; and wherein, in a warm engine start mode, the second clutch is in the engaged position to ground the first-stage planet carrier and the first and third clutches are in the disengaged positions, and further, the rotational power from the electric machine moves in the first power flow direction from the input shaft, to the first-stage sun gear, to the first stage-planet gears, and to the ring gear out to the engine at the second gear ratio.

12. The combination starter-generator device of claim 11, wherein, in a boost mode, the third clutch is in the engaged position to couple the input shaft to the ring gear and the first and second clutches are in the disengaged positions, and further, the rotational power from the electric machine moves in the first power flow direction from the input shaft, to the first-stage and second-stage sun gears, to the first-stage and second-stage planet gears, and to the ring gear out to the engine at the third gear ratio; and wherein, in a generation mode, the third clutch is in the engaged position to couple the input shaft to the ring gear and the first and second clutches are in the disengaged positions, and further, rotational power from the engine moves in the second power flow direction from the ring gear, to the first-stage and second-stage planet gears, to the first-stage and second-stage sun gears, and to the input shaft out to the electric machine at the fourth gear ratio.

13. The combination starter-generator device of claim 12, wherein each of the third gear ratio and the fourth gear ratio is a 1:1 ratio through the gear set, and wherein the first gear ratio is greater than the second gear ratio, and the second gear ratio is greater than the third gear ratio.

14. A drivetrain assembly for a work vehicle, comprising:
an engine;
an electric machine;
a gear set configured to receive rotational input from the electric machine and from the engine and to couple the electric machine and the engine in a first power flow direction and a second power flow direction, the gear set configured to operate in one of at least a first gear ratio, a second gear ratio, a third gear ratio, or a fourth gear ratio, wherein the first gear ratio, the second gear ratio and the third gear ratio are in the first power flow direction and the fourth gear ratio in the second power flow direction, wherein the gear set includes a ring gear formed by a cylindrical base with a perimeter surface facing the engine and a circumferential row of castellations extending in a radial direction from the perimeter surface;
at least one clutch selectively coupled to the gear set to effect the one of at least the first, second, and third gear ratios in the first power flow direction and the fourth gear ratio in the second power flow direction;
an actuation assembly configured to selectively shift the at least one clutch from a disengaged position in which the at least one clutch is decoupled from the gear set into an engaged position in which the at least one clutch is coupled to the gear set; and
a mounting arrangement comprising a drive plate configured to be secured to a crank shaft of the engine and a flex plate mounted to the drive plate, wherein the flex plate includes a row of engagement apertures configured to receive the castellations of the ring gear to rotationally couple the ring gear to the engine via the mounting arrangement, wherein the castellations of the ring gear and the engagement apertures of the flex plate enable circumferential engagement between the ring gear and the flex plate without the ring gear being fixedly secured to the flex plate in a radial direction.

15. The drivetrain assembly of claim 14, wherein the mounting arrangement further comprises a primary housing that at least partially encloses the gear set and at least one mounting leg extending from the primary housing for mounting the combination starter-generator device to the engine.

16. The drivetrain assembly of claim 14, wherein the drive plate includes a torsional damper configured to dampen vibrations.

17. The drivetrain assembly of claim 14, wherein the cylindrical base and castellations of the ring gear are integrally formed.

18. The drivetrain assembly of claim 14, further comprising:
a belt and pulley coupled to the gear set and the electric machine, wherein input power in the first power flow direction is conveyed from the electric machine to the gear set by the belt and pulley, wherein in the first power flow direction the belt and pulley rotate in the first clock direction and in the second power flow direction the belt and pulley rotate in the second clock direction; and
a single belt tensioner applying tension to a first side of the belt in both the first power flow direction and the second power flow direction.

* * * * *